US009998982B2

(12) United States Patent
Horn et al.

(10) Patent No.: US 9,998,982 B2
(45) Date of Patent: Jun. 12, 2018

(54) ENHANCED ACCESS NETWORK QUERY PROTOCOL (ANQP) SIGNALING FOR RADIO ACCESS NETWORK (RAN) SHARING

(71) Applicant: QUALCOMM Incorporated, San Diego, CA (US)

(72) Inventors: Gavin Bernard Horn, La Jolla, CA (US); Stefano Faccin, Hayward, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/807,824

(22) Filed: Jul. 23, 2015

(65) Prior Publication Data
US 2016/0183169 A1 Jun. 23, 2016

Related U.S. Application Data

(60) Provisional application No. 62/095,714, filed on Dec. 22, 2014.

(51) Int. Cl.
H04W 48/14 (2009.01)
H04L 29/08 (2006.01)
(Continued)

(52) U.S. Cl.
CPC ............ *H04W 48/14* (2013.01); *H04L 67/16* (2013.01); *H04L 69/08* (2013.01); *H04W 48/18* (2013.01)

(58) Field of Classification Search
CPC ...... H04W 48/14; H04W 48/18; H04L 69/08; H04L 67/16
See application file for complete search history.

(56) References Cited

U.S. PATENT DOCUMENTS 8,817,707 B2   8/2014  Gupta
2006/0172741 A1*  8/2006  Jeong ............... H04W 36/0061
                                                        455/446
(Continued)

FOREIGN PATENT DOCUMENTS

WO   WO-2013134669 A1   9/2013
WO   WO-2014106434 A1   7/2014

OTHER PUBLICATIONS

PCT/US2015/065317—International Preliminary Report on Patentability Chapter II (IPEA/409), 35 Pages, dated Oct. 27, 2016.*
(Continued)

*Primary Examiner* — Brian J Gillis
*Assistant Examiner* — Amy Ling
(74) *Attorney, Agent, or Firm* — Qualcomm IP Dept.; James Hunt Yancey, Jr.

(57) ABSTRACT

Features pertain to determining, at a client device, to send a query to a network access node. The query may be associated with a plurality of serving networks, each serving network identified with a serving network identifier. A first serving network identifier may be selected to associate with the query. The query may be sent to the network access node. The query may include the first serving network identifier, and in some aspects, a second serving network identifier. Additional features pertain to receiving, at a network node, a query including a first serving network identifier. The network node may be associated with a plurality of serving networks. A first server to which to forward the query may be determined at the network node. The first serving network identifier identifies the first server. The query may be sent to the first server.

27 Claims, 20 Drawing Sheets

(51) Int. Cl.
*H04L 29/06* (2006.01)
*H04W 48/18* (2009.01)

(56) References Cited

U.S. PATENT DOCUMENTS

| | | |
|---|---|---|
| 2013/0272287 A1 | 10/2013 | Xiang et al. |
| 2013/0288668 A1 | 10/2013 | Pragada et al. |
| 2014/0112327 A1 | 4/2014 | Calcev et al. |
| 2014/0204903 A1* | 7/2014 | Kim .................. H04W 48/18 370/331 |
| 2014/0233406 A1 | 8/2014 | Chhabra et al. |
| 2014/0295913 A1* | 10/2014 | Gupta ................ H04W 74/02 455/552.1 |
| 2014/0341072 A1* | 11/2014 | Cai .................... H04W 48/14 370/254 |
| 2014/0359148 A1 | 12/2014 | Cherian et al. |
| 2015/0071141 A1 | 3/2015 | Vallabhu |
| 2015/0078359 A1 | 3/2015 | Scahill et al. |
| 2015/0117430 A1* | 4/2015 | Zhuang ................ H04L 67/16 370/338 |

OTHER PUBLICATIONS

International Search Report and Written Opinion—PCT/US2015/065317—ISA/EPO—dated Mar. 8, 2016.
Liu D(CMCC): "Protocol Architecture of 802.11aq, 11-13-1091-03-00aq-protocol-architecture-of-802-l1aq", IEEE draft, 11-13-1091-03-00AQ-Protocol-Architecture-of-802-11aq, IEEE-SA Mentor, Piscataway, Nj, USA, vol. 802.11aq, No. 3, Nov. 11, 2013 (Nov. 11, 2013), pp. 1-10, XP068063000, [retrieved on Nov. 11, 2013] the whole document.

* cited by examiner

ENHANCED ACCESS NETWORK QUERY PROTOCOL (ANQP) SIGNALING FOR RADIO ACCESS NETWORK (RAN) SHARING

This application claims priority to U.S. Provisional Application No. 62/095,714, filed Dec. 22, 2014, titled Enhanced Access Network Query Protocol (ANQP) Signaling For Radio Access Network (RAN) Sharing, the contents of which are incorporated by reference herein.

FIELD

The present disclosure relates generally to communication devices and methods of signaling that facilitate a radio access network (RAN) provider to host access for one or more connectivity access network providers via a network access node that was heretofore restricted to use by a single connectivity access network/radio access network provider.

BACKGROUND

Wireless communication systems, including wireless mobile systems, are widely deployed to provide various telecommunication services. Telecommunication services include voice services, data services, voice and data connectivity, Internet connectivity, voice over Internet protocol (VoIP), wireless point-to-point, video, streaming video, videotelephony, messaging, and broadcasting to name a few.

Typical wireless communication systems employ multiple-access technologies. Examples of such multiple-access technologies include code division multiple-access (CDMA), time division multiple-access (TDMA), frequency division multiple-access (FDMA), orthogonal frequency division multiple-access (OFDMA), single-carrier frequency division multiple-access (SC-FDMA), and time division synchronous code division multiple-access (TD-SCDMA).

Multiple-access technologies have been adopted in various telecommunication standards to provide common protocols that enable wireless and mobile devices to communicate on a municipal, national, regional, and global level. Wireless services are offered by many providers using various standards on cellular local area networks (cellular LANs) and wireless local area networks (WLANs). Standards applicable to cellular LANs include those promulgated by the $3^{rd}$ Generation Partnership Project (3GPP), such as 3G, 4G, Long Term Evolution (LTE), and LTE-Advanced (LTE-A). LTE-A provides a set of enhancements to the Universal Mobile Telecommunications System (UMTS) mobile standard promulgated by the 3GPP. A next evolution of the 3GPP standards is being considered; it may be referred to as 5G. Standards applicable to WLANs include those promulgated by the Institute of Electrical and Electronics Engineers (IEEE), such as IEEE 802.11 (commonly and/or variously referred to as Wi-Fi® and/or Hotspot 2.0). IEEE 802.11 is a set of media access control (MAC) and physical layer (PHY) specifications for implementing WLAN communication.

Communication systems using multiple-access technologies simultaneously support communication for multiple user devices. In general, a user device serves as an interface to a network. A user device can take on any number of forms. It may be a mobile hand-held device such as a cellular phone, a laptop, or notepad computer, a wrist-worn device, or a device configured to be worn in any way by a user. It may alternatively be a fixed device, such as a computer/cellular phone interface used in a building alarm system, or a machine-to-machine (M2M) type device that may facilitate communication between, for example, a television, refrigerator, bathroom scale, and/or washing machine. It need not receive input through a human-machine interface (e.g., a physical or image based keyboard or a voice command interface).

In the context of 3GPP, a user device is generally referred to as a user equipment (UE). In the context of IEEE 802.11, a user device is generally referred to as a station (STA). However, many user devices can communicate using both a cellular LAN and a WLAN (e.g., many cellular phones communicate over both a 3GPP network and an IEEE 802.11 network). Accordingly, the same user device may be both a UE and a STA. Furthermore, in standards other than 3GPP and IEEE 802.11, or in accordance with non-standard based protocols or practices, a user device may be referred to by other names including, for example, a terminal, client device Access Network Query Protocol (ANQP) is a protocol defined by the IEEE and the Wi-Fi Alliance®. The Wi-Fi Alliance is a global non-profit industry association that certifies Wi-Fi® products for interoperability and industry-standard security protections. ANQP is presently defined for IEEE 802.11. ANQP provides a protocol that allows a STA to query a WLAN access point (AP) (e.g., an AP under 802.11, Wi-Fi, or Hotspot 2.0) without requiring a security association with the AP. A STA can use ANQP to perform network discovery and selection at an AP. In addition, the STA can discover information, at the AP level, about AP features/characteristics (e.g., load) and supported services (e.g., including supported service providers, connectivity type, etc.). An example of an AP may be a wireless modem or wireless router at a home, store, office, or in a vehicle. APs may be indoor or outdoor. Outdoor APs may appear in cities, suburbs, and/or college, corporate, or government campuses to provide, for example, Internet access to a community.

An AP may traditionally be thought of as a radio device that connects to a network (typically the Internet) via an Internet Service Provider (ISP). Consequently, connectivity to a network via an AP, for a given STA, is traditionally determined by one ISP.

As implemented today under IEEE 802.11u, the concept of a 3GPP-style radio access network (RAN) provider that is separate from a 3GPP-style connectivity access network provider does not exist. As implemented today, an IEEE 802.11 AP fulfills the general functions of both the RAN and connectivity access network providers. In other words, using the terminology of 3GPP in the context of IEEE 802.11, the RAN provider and the connectivity access network provider are always the same entity. This is in contrast to 3GPP systems, where the RAN provider and the connectivity access network provider may be different entities.

ANQP, being defined for IEEE 802.11, does not contemplate, and is unable to support, a plurality of connectivity access network providers at a single AP. Therefore, a STA can determine what services are supported by a given AP, but only under the assumption that the AP is associated with a single entity that functions as a combination of the 3GPP-style RAN and connectivity access network providers. This is problematic, at least because each AP can provide connectivity to only a limited number of service providers.

RAN sharing (i.e., the sharing of a single RAN by a plurality of connectivity access network providers) is not defined for IEEE 802.11. It would be beneficial to allow an AP to be shared by a plurality of connectivity access network providers. This would allow for an increase in the number of service providers (and their associated services) available to a STA at the AP. In such a scenario, a given AP may offer a STA a greater number of choices of service providers. However, a greater number of choices in service providers at a given AP presents problems of its own. ANQP does not scale well; it is cumbersome and not flexible for queries involving a large number of service providers.

Current idle mode selection behavior is for an AP to perform public land mobile network (PLMN) selection, and then perform cell selection with the selected PLMN. PLMNs are identified using a PLMN identifier (PLMN ID). Presently, the PLMN ID has two components. The first component is the Mobile Country Code (MCC). The MCC is 3 digits. It uniquely identifies a country. The second component is the Mobile Network Code (MNC). The MNC is a 2 or 3 digit number (depending on the value of the MCC). The MNC identifies the operator within the country. At best, using a 3 digit MNC, only 1000 operators can be defined for a given country. The number of operators in many countries has already, or soon will, exceed 1000. Accordingly, it is not feasible to provide all operators (e.g., operators of WLANs under IEEE 802.11, operators of cellular LANs under 3GPP, etc.) with PLMNs.

Furthermore, APs under IEEE 802.11, are known to periodically broadcast over-the-air messages, to advertise that a certain limited number of service providers are available at the AP, and to provide the identities of the certain limited number of service providers being advertised. Such broadcasts may be made, for example, by a beacon such as a system information block-type 1 (SIB1) transmission. However, only six PLMN IDs can be included in a current SIB1 transmission. Even if a new identifier was introduced to enable a larger access network identifier space, it would still not enable a network access node (e.g., access point or eNodeB) to support a large number of associated service providers.

Furthermore, if an AP is shared by more than a fixed maximum number of service providers that can be advertised in a broadcast, the advertisement cannot inform client devices of an opportunity to select from among the unadvertised service providers that share the AP with the advertised service providers. Such unadvertised service providers are therefore unintentionally hidden from client devices.

Additionally, certain service providers do not want their networks to be advertised to the public in a beacon transmission. An example of such network might be a closed subscriber group (CSG). Access to a CSG is available to subscribers of the CSG, but not to the general public. These service providers are therefore intentionally hidden from client devices.

Nevertheless, there is a growing need to support an ever growing number of services and/or service providers at each type of network access node (e.g., AP access nodes under IEEE 802.11 and eNB access nodes under 3GPP). Consequently, the inability of ANQP to scale to support a large number of services and/or service providers at a given network access node is problematic.

Accordingly, problems exist as to how to allow a client device to obtain a selective list of connectivity access network providers, services, and/or service providers from a network access node and/or how to select which of a plurality of connectivity access network providers, services, and/or service providers should appear on a default list of connectivity access network providers, services, and/or service providers to be advertised to client devices from a network access node.

SUMMARY

According to one aspect, a method that may be operational at a client device may include determining to send a query to a network access node, wherein the network access node is associated with a plurality of serving networks, each serving network identified with a serving network identifier. The determination may be made at the client device. The method may include selecting a first serving network identifier to associate with the query. The method may further include sending the query to the network access node, where the query may include the first serving network identifier. In some aspects, the query may further include an element of information, the element of information describing one or more network capabilities supported by a network associated with a first serving network identifier. Serving network identifiers, may include a service set identifier (SSID) identifier, a public land mobile network identifier (PLMN ID) identifier, a service provider identifier (SPI) identifier, or a network access identifier (NAI) realm identifier. In some aspects, the first serving network identifier may identify a server of a first serving network in the plurality of serving networks.

In one aspect, the method may further include obtaining, at the client device, serving network identifiers of each of the plurality of serving networks associated with the network access node. The receipt of this information may occur prior to determining the first serving network identifier. In one aspect, the serving network identifiers may be obtained from a broadcast message from the network access node or from a unicast message from the network access node.

In one aspect, selecting a first serving network identifier from among the plurality of serving network identifiers may be based on whether a preexisting relationship is established between the client device and a serving network identified by the first serving network identifier. There may be a preference to select the serving network with a preexisting relationship. A preexisting relationship may be established when the client device has a subscription with the serving network identified by the first serving network identifier and/or when the first serving network identifier is included on a preexisting list of preferred serving networks configured in the client device. Other ways to select the first serving network identifier are acceptable.

In some aspects, the client device may enter into, or may update a subscription with, a serving network identified by the first serving network identifier via wireless communication.

In some aspects, the query may include an access network query protocol (ANQP) query on a wireless local area network (WLAN). The query may include a non-access stratum (NAS) message and/or a radio resource control (RRC) message.

According to some aspects, the method may further include selecting a second serving network identifier to associate with the query prior to sending the query. The second serving network identifier may be different from the first serving network identifier. The first serving network identifier and second serving network identifier may be different types of serving network identifiers. The different types of serving network identifiers may include a service set identifier (SSID) type identifier, a public land mobile network identifier (PLMN ID) type identifier, a service provider identifier (SPI) type identifier, and a network access identifier (NAI) realm type identifier. The method may further include sending the query to the network access node. The query sent to the network access node may include the element of information, the first serving network identifier, and the second serving network identifier. In some aspects, the first serving network identifier and second serving network identifier may identify different servers. The different servers may be on a same serving network or on different serving networks.

In some aspects, the method may further include selecting a second serving network identifier to associate with the query prior to sending the query. The first serving network identifier may represent a public serving network and the second serving network identifier may represent a private serving network. The method may further include sending the query to the network access node, where the query may include the element of information, the first serving network identifier, and the second serving network identifier.

According to one aspect, a method that may be operational at a network node. The network node may be, for example, a network access node and/or mobility management entity (MME). The method may include receiving, at the network node, a query including an element of information and a first serving network identifier. In some aspects, the network node may be associated with a plurality of serving networks. The method may further include determining an identity of a first server to which to forward the query. In some aspects, the first serving network identifier may provide the identity of the first server. The method may still further include sending the query to the first server. Examples of a network node may include a network access node (e.g., an eNB, an AP, a STA) and/or a mobility management entity (MME). In some aspects, the query may include an access network query protocol (ANQP) query on a wireless local area network (WLAN). The query may include a non-access stratum (NAS) message and/or a radio resource control (RRC) message. The first serving network identifier may be used to identify a server of a first serving network in the plurality of serving networks.

In one aspect, the query may further include a second serving network identifier that is different from the first serving network identifier. The second serving network identifier may be used to identify a server of a second serving network in the plurality of serving networks. The method may further include determining a second server to which to forward the query, wherein the second serving network identifier identifies the second server. The method may still further include sending the query to the second server.

DRAWINGS

Various features, nature and advantages may become apparent from the detailed description set forth below when taken in conjunction with the drawings in which like reference characters identify correspondingly throughout.

DETAILED DESCRIPTION

Figure 1:
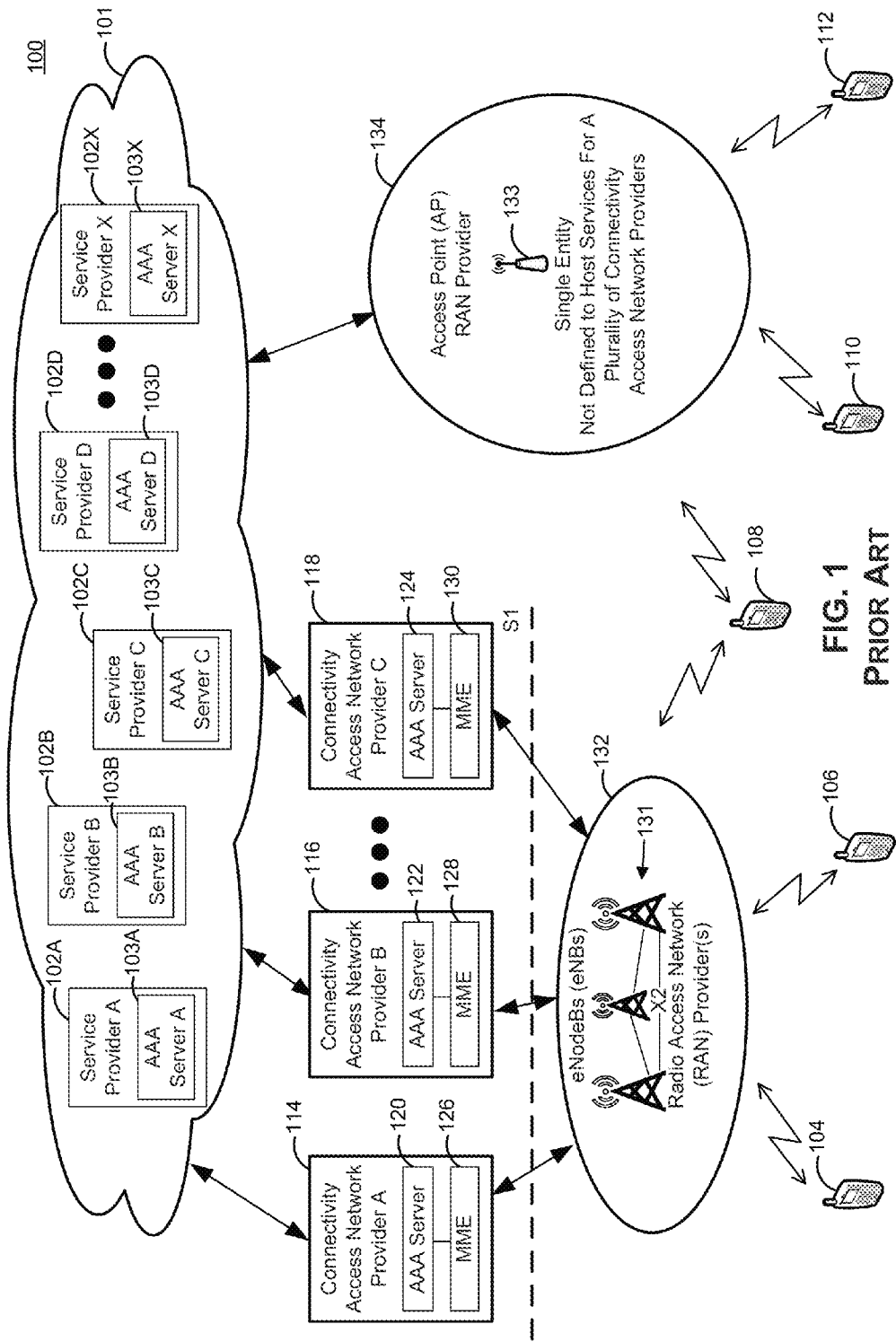
FIG. 1 illustrates a network architecture according to the prior art.

The detailed description set forth below in connection with the appended drawings is intended as a description of various configurations and is not intended to represent the only configurations in which the various concepts described herein may be practiced. The detailed description includes details for the purpose of providing a thorough understanding of the various concepts. However, it will be apparent to those skilled in the art that these concepts may be practiced without these details. In some instances, the details of well-known structures and components are shown in block diagram form in order to avoid obscuring such concepts. Like reference numbers appearing in various figures are understood to have been described in connection with an earlier figure.

In the following description, reference is made to the accompanying drawings in which is shown, by way of illustration, specific aspects and features described in the disclosure. The aspects and features described in the disclosure are intended to be provided in sufficient detail to enable those skilled in the art to practice the invention. Other aspects and features may be utilized and changes may be made to that which is disclosed without departing from the scope of the disclosure. The following detailed description is not to be taken in a limiting sense, and the scope of the aspects and features described and illustrated herein is defined only by the appended claims.

As used herein, a "client device" may be any device that provides a human and/or a machine with an interface to a serving network. The term "client device" may be used herein to refer to a wireless device, mobile device, subscriber device, network access device, mobile phone, mobile communication device, mobile computing device, digital tablet, smart phone, user equipment, user device, user terminal, terminal, among other devices. The term "network access node" includes any device that provides wireless network connectivity between a client device and a serving network. Networks external to a core network of a cellular communication system, such as a packet data network (PDN) (e.g., the Internet) and an Internet Protocol (IP) Multimedia Service (IMS) network may be exemplified herein by reference to the PDN, however, nothing is intended to limit networks external to the core network to PDNs or IMS networks. Furthermore, aspects and features presented herein are exemplary. Nothing is intended to limit any aspect or feature presented herein to use in only a cellular communication system.

Overview

A current access network query protocol (ANQP) scheme assumes the network access node (e.g., AP) supports a single server for a client device to query to determine a set of service providers (e.g., 3GPP Cellular Network Information and Roaming Consortium Organization Identifiers). It does not account for a possibility of the network access node supporting a large number of service providers, and does not account for implementation of radio access network (RAN) sharing, i.e., where the network access node (which may conceptually be considered as a part of the RAN) can be coupled to a plurality of connectivity access network providers; each connectivity access network provider having characteristics that vary depending on the service providers to which it is coupled.

For RAN sharing, the RAN, and hence at least some of the network access nodes in the RAN, may connect to two or more serving networks, in which case the different serving networks may support, for example, different types of credentials for a client device to access. In this case, the client device may need to query the serving network and not the RAN to determine what types of access and services are supported.

Aspects described herein extend the current ANQP scheme to enable a network access node to support a larger number of service providers and a broader set of services than have heretofore been considered reasonable/practical. The aspects described herein may extend ANQP by, for example, enabling a client device to indicate a specific provider to which a query is to be directed. The enhanced ANQP may be run by the network access node independently of whether the service provider associated with a client device has a roaming relationship with a service provider being serviced by the network access node. The client device may query the network access node to determine if roaming is available. Implementation of at least three modes of queries, where the three modes of queries may be useful for ANQP and for other protocols relating to service queries, may be provided for in aspects described herein.

A client device may use a serving network identifier as part of an enhanced query. The enhanced query may include one or more serving network identifiers. That is, the query may be directed to one or more serving network identifiers. The serving network identifier may be selected by the client device. Examples of serving network identifiers may include a service set identifier (SSID), a public land mobile network identifier (PLMN ID), a service provider identifier (SPI), and a network access identifier (NAI) realm. This list is exemplary and not limiting.

The selection of one or more serving network identifiers may permit the client device to direct the enhanced query to a specific server when RAN sharing is advertised. For ease of reference, the specific server may be referred to herein as a service query protocol server (SQP server). This may allow a network access node to be associated with multiple connectivity access network providers, each providing different services, features, and/or characteristics to the network access node.

For expository purposes, an extended or enhanced query protocol (e.g., an extended or enhanced ANQP) presented in the aspects described herein will be referred to as Service Query Protocol (SQP). However, it will be understood that any extension or enhancement of a protocol, such as ANQP used in WLAN, or a 3GPP querying protocol used in cellular LAN, can benefit from implementation of the aspects described herein. Therefore, for example, the aspects of methods and apparatus described herein are useful for all types of wireless and cellular LAN network access nodes, such as, without limitation, access points (APs) defined under IEEE 802.11, Wi-Fi, and/or Hotspot 2.0 as well as eNodeBs defined under 3GPP standards. For ease of reference, any type of wireless and/or cellular LAN network access node will be referred to herein as a network access node. Upon receiving an SQP query including a serving network identifier, a network access node may determine whether there is an SQP server associated with such a serving network identifier. If there is, the network access node may route the SQP query to the related SQP server, and the related SQP server, in return, may route a response to the client device. If there is no associated SQP server, the network access node may route the SQP query to a default server.

Methods and apparatus are disclosed herein that permit a client device to discover the service providers and the service information for a serving network of, for example, an AP providing RAN sharing.

Operational Environment

Figure 2:
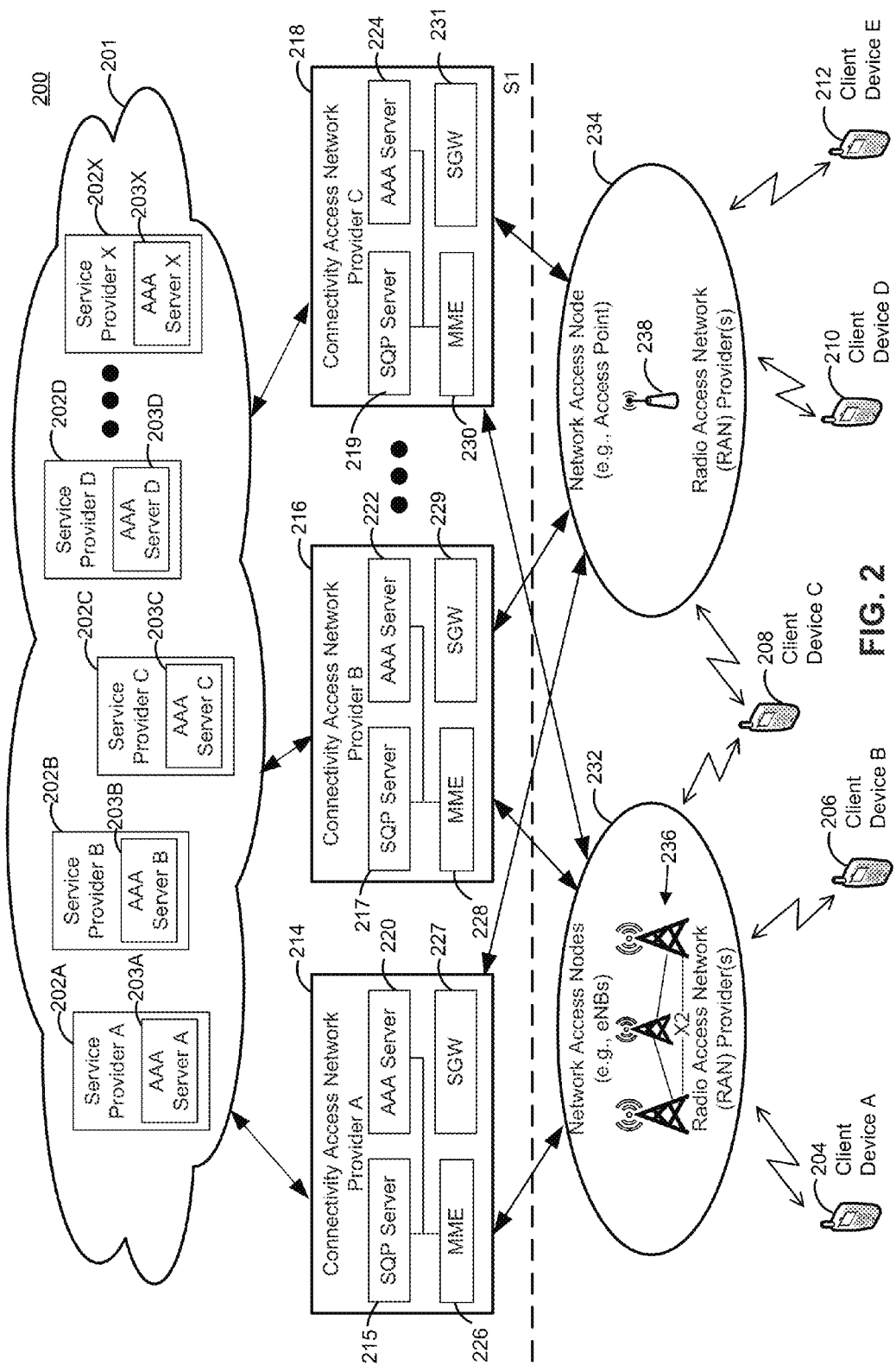
FIG. 2 illustrates a network architecture in accordance with an exemplary aspect described herein.

FIG. 1 illustrates a network architecture 100 according to the prior art. FIG. 2 illustrates a network architecture 200 in accordance with an exemplary aspect described herein. It will be understood that FIGS. 1 and 2 are simplified illustrations; many features well-known to those of ordinary skill in the art are omitted from FIGS. 1 and 2 to reduce clutter.

FIG. 1 illustrates a plurality of service providers 102A, 102B, 102C, 102D, . . . , 102X (individually or collectively referred to herein as service provider 102). A service provider 102 is depicted as residing in a network 101, such as a packet data network (e.g., the Internet). Each service provider 102 may host credentials for various client devices 104, 106, 108, 110, 112. Credentials may be stored in authentication, authorization, and accounting (AAA) servers 103A, 103B, 103C, 103D, . . . , 103X (individually or collectively referred to herein as AAA server 103). Credentials may include credentials for service providers such as a social networking site service provider and/or a search engine site service provider. Each service provider 102 typically maintains billing relationships with connectivity access network providers 114, 116, 118.

Connectivity access network providers 114, 116, 118 (sometimes referred to as mobile network operators (MNOs)) may host sessions for client devices 104, 106, 108 to access services offered by service providers 102 (i.e., assuming the connectivity access network provider 114, 116, 118 has a relationship with the service provider 102 and the client device 104, 106, 108 has a subscription for the service). Connectivity access network providers 114, 116, 118 typically enforce subscription limits defined by the service providers 102. Connectivity access network providers may also be service providers as will be understood by those of skill in the art.

Each connectivity access network provider 114, 116, 118 may also include a respective AAA server 120, 122, 124. Each connectivity access network provider 114, 116, 118 may also include a respective mobility management entity (MME) 126, 128, 130. MMEs 126, 128, 130 and AAA servers 120, 122, 124 may be represented as protocol stacks comprised of multiple layers. Connectivity access network providers 114, 116, 118 may operate, for example, in accordance with 3GPP standards, such as LTE.

FIG. 1 further illustrates one or more radio access network (RAN) providers 132, 134. RAN provider 132 hosts access for one or more connectivity access network providers 114, 116, 118 via network access nodes 131 (e.g., evolved node Bs, eNodeBs, or eNBs). A practice of having a plurality of connectivity access network providers 114, 116, 118 share a RAN provider 132 may be referred to as RAN sharing. For ease of illustration, RAN provider 132 is depicted as operating a plurality of network access nodes 131 according to 3GPP standards. RAN sharing is defined in 3GPP standards; however, RAN sharing is not defined for IEEE 802.11 standards.

A RAN provider 134 may operate an access point (AP) 133 according to IEEE 802.11. At least because RAN sharing is not defined for IEEE 802.11, the RAN provider 134 communicates with one or more service providers directly, as opposed to via a connectivity access network provider.

Although only two RAN providers 132, 134 are illustrated in FIG. 1, it will be understood that a plurality of RAN providers may be present in any geographic area.

RAN providers 132, 134 may host access for client devices 104, 106, 108, 110, 112. A RAN provider 132 may enforce subscription limits that are defined by each of the plurality of connectivity access network providers 114, 116, 118, which may be, in turn, defined by the service providers 102. At least one of a plurality of connectivity access network providers 114, 116, 118 may be associated with a plurality of service providers 102. A RAN provider 134 may enforce subscription limits that are defined by the service providers 102. The service providers 102 may maintain billing relationships with network access nodes 131 (e.g., eNBs) of RAN provider 132 and the AP 133 (e.g., network access node) of RAN provider 134. Subscription limits may be, for example, limits on data usage and/or time.

As the number of client devices continually increases, the number of client devices connected to a given RAN, and/or a given network access node of the given RAN, will more than likely increase. Furthermore, it is anticipated that a process of interworking, where client device to service provider communication via a first type of network is offloaded to a second type of network, will become ever more common place. Accordingly, it is desirable to enable client devices to transparently/autonomously switch between one type of network (e.g., 3GPP) and another type of network (e.g., IEEE 802.11) in a seamless manner, without a need for user intervention. User intervention, however, is presently typically required. By way of example, when a client device needs to transfer connectivity from a cellular LAN to a wireless LAN (e.g., when entering a hotel or a WLAN provisioned public park or mass transit vehicle), the user may typically search for and select an appropriate wireless LAN from a list of wireless LANs in the geographic area of the client device. The user may then obtain and manually enter a password to gain access to the selected wireless LAN.

In the case of wireless LANs, because the AP (e.g., 133, FIG. 1) of a given RAN provider (e.g., 134, FIG. 1) has a connection to a limited number of service providers, a client device may need to attempt communication with multiple APs before (and even if) it is successful in finding an AP that has a service agreement with a service provider associated with the client device.

Accordingly, at least to avoid a manual process of selecting and connecting to multiple WLANs in order to obtain connection to a desired service provider, it would be beneficial to implement RAN sharing in IEEE 802.11. In this way, a single AP could host multiple connectivity access networks, each hosting access to various pluralities of service providers offering various pluralities of services. Implementation of RAN sharing in IEEE 802.11 could give a client device a higher probability of finding its desired service provider (and/or service) from among the plurality of service providers (and/or services) hosted by the plurality of connectivity access networks.

However, queries to APs are presently implemented using Access Network Query Protocol (ANQP), defined by IEEE 802.11 and the WiFi Alliance. ANQP allows a client device to determine, at the AP level, what services are offered by the AP. This works today because, for an AP, the connectivity provider and access provider are the same entity. A client device can determine what services are behind the AP, but only under the assumption that the connectivity provider and access provider are the same entity. ANQP as it presently exists does not contemplate, and has no ability to support multiple connectivity providers at a single AP The client devices 104, 106, 108, 110, 112 may host credentials for service providers 102 and connect to services via RAN providers 132, 134. Each client device 104, 106, 108, 110, 112 may store credentials in a respective memory circuit (not shown). Client devices 104, 106, 108, which access services via the RAN provider 132, determine what service provider and/or services to connect to via selection of one of a plurality of connectivity access network providers 114, 116, 118.

Client devices 108, 110, 112, which access network services via RAN provider 134, are limited in their ability to determine what network services to connect to, because each AP 133 is known in the prior art to be a single entity that is not defined to host services for a plurality of connectivity access network providers.

FIG. 2 illustrates a network architecture 200 in accordance with an exemplary aspect described herein. The exemplary network architecture 200 may be representative of a next generation (5G) network architecture; however, the aspects presented herein are not limited to the exemplary network architecture 200 of FIG. 2.

FIG. 2 illustrates a plurality of service providers 202A, 202B, 202C, 202D, . . . , 202X (individually or collectively referred to herein as service provider 202). A service provider 202 is depicted as residing in a network 201, such as a packet data network (e.g., the Internet). Each service provider 202 may host credentials for various client devices, such as client devices 204, 206, 208, 210, 212. Credentials may be stored in authentication, authorization, and accounting (AAA) servers 203A, 203B, 203C, 203D, . . . 203X (individually or collectively referred to herein as AAA server 203). Credentials may include credentials for service providers such as a social networking service provider and/or a search engine service provider. Each service provider 202 typically maintains billing relationships with connectivity access network providers 214, 216, 218.

Connectivity access network providers 214, 216, 218 (sometimes referred to as mobile network operators (MNOs)) may host sessions for client devices 204, 206, 208, 210, 212 to access services offered by service providers 202 (i.e., assuming the connectivity access network provider 214, 216, 218 has a relationship with the service provider 202 and the client device 204, 206, 208, 210, 212 has a subscription for the service). The connectivity access network providers 214, 216, 218 typically enforce subscription limits defined by the service providers 102. Connectivity access network providers may also be service providers as known to those of skill in the art. The connectivity access network providers 214, 216, 218 may operate, for example, in accordance with 3GPP standards and/or IEEE 802.11 standards.

Each connectivity access network provider 214, 216, 218 may also include a respective server, referred to for ease of identification herein as service query protocol server (SQP server) 215, 217, 219. SQP servers are described below. Each connectivity access network provider 214, 216, 218 may also include a respective AAA server 220, 222, 224. Each connectivity access network provider 214, 216, 218 may also include a respective mobility management entity (MME) 226, 228, 230. Each connectivity access network provider 214, 216, 218 may also include a respective serving gateway (SGW) 227, 229, 231. SQP servers 215, 217, 219, AAA servers 220, 222, 224, MMEs 226, 228, 230, and SGWs 227, 229, 231 may be represented as protocol stacks comprised of multiple layers. The typical operation and function of AAA servers, MMEs, and SGWs are known to those of skill in the art.

FIG. 2 further illustrates one or more RAN providers 232, 234. For ease of illustration, RAN provider 232 is depicted as operating a plurality of network access nodes 236 (e.g., eNBs) according to 3GPP standards, while RAN provider 234 is depicted as operating one network access node 238 (e.g., AP) according to IEEE standards. It will be understood that a RAN provider may operate any number of network access nodes.

The aspects described herein facilitate RAN sharing between connectivity access network providers that host network access nodes (e.g., such nodes may operate in accordance with one or more IEEE standards). In the exemplary aspect of FIG. 2, both of the first RAN provider 232 and the second RAN provider 234 may support RAN sharing in connection, for instance, with 3GPP standards and/or IEEE standards. In the exemplary aspect of FIG. 2, connectivity access network provider A 214, connectivity access network provider B 216, and connectivity access network provider C 218 share the first RAN provider 232 and the second RAN provider 234. However, it will be understood that aspects described herein are not limited to the RAN sharing scenario exemplified in FIG. 2; any combination of connectivity access network providers may share one or more RANs.

Although only two RAN providers 232, 234 are illustrated in FIG. 2, it will be understood that a plurality of RAN providers may be present in any geographic area. Additionally, it will be understood that APs can be collocated with eNBs.

RAN providers 232, 234 may host access for client devices 204, 206, 208, 210, 212. RAN providers 232, 234 may enforce subscription limits that are defined by the connectivity access network providers 214, 216, 218, which may be, in turn, defined by the service providers 202. Service providers 202 may maintain billing relationships with the network access nodes 236 of the first RAN provider 232 and the network access node 238 of second RAN provider 234. Subscription limits may be, for example, limits on data usage and/or time.

Client devices 204, 206, 208, 210, 212 may host credentials for service providers 202 and connect to services via the RAN providers 232, 234. Each client device 204, 206, 208, 210, 212 may store credentials in a respective memory circuit (not shown). Client devices 204, 206, 208, 210, 212 may determine which connectivity access network provider, service provider, and/or service to connect to via SQP queries sent to one of the plurality of connectivity access network providers 214, 216, 218 participating in RAN sharing of network access nodes 236, 238. In one aspect, the SQP queries may be forwarded, for example, to the SQP servers 215, 217, 219.

As used herein, a serving network may comprise one or more service providers 202, one or more connectivity access network providers 214, 216, 218, or a combination of at least one service provider and at least one connectivity access network provider. A serving network identifier may be used to identify a serving network.

Figure 3:
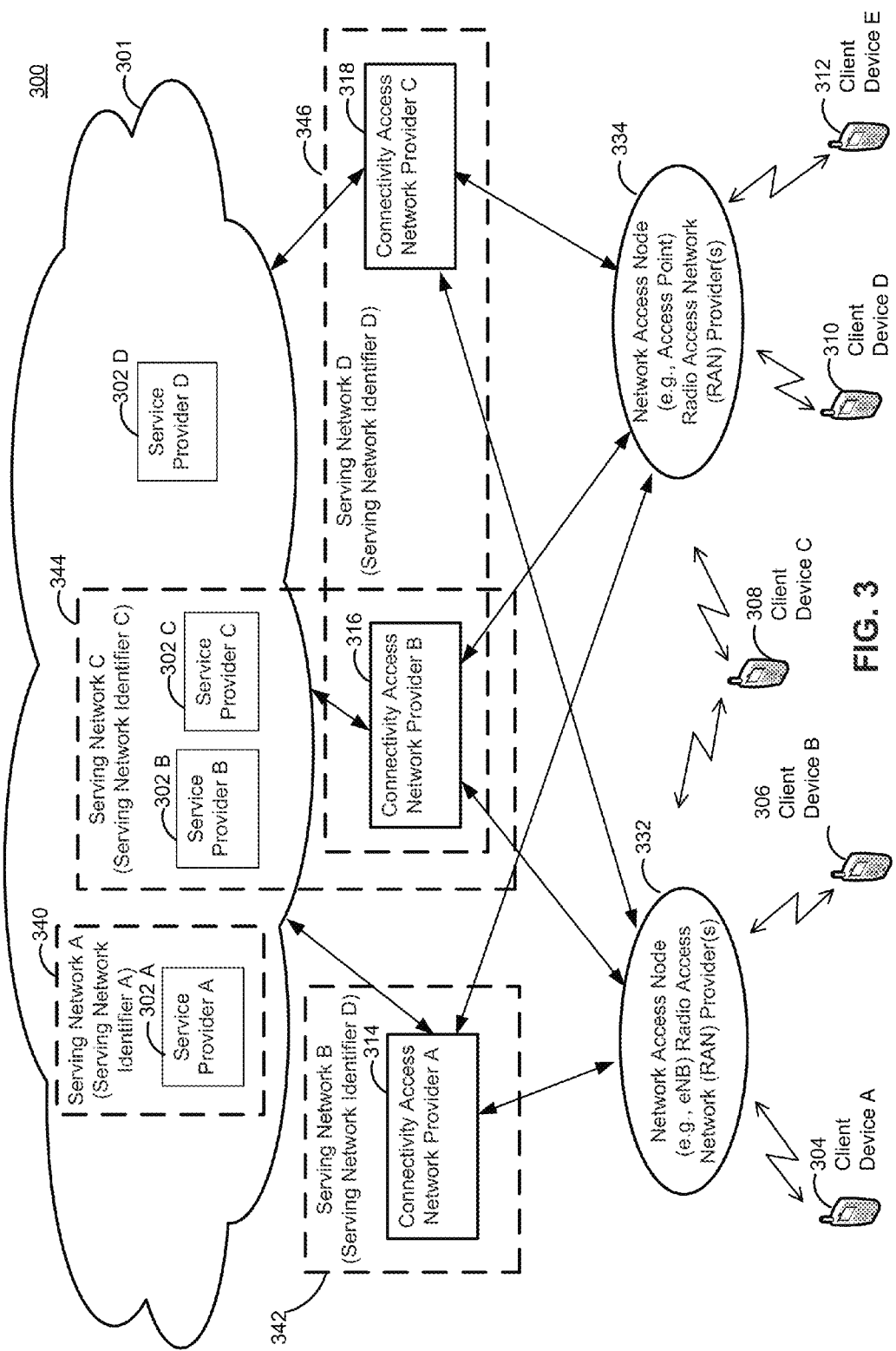
FIG. 3 illustrates another network architecture in accordance with an exemplary aspect described herein.

FIG. 3 illustrates another network architecture 300 in accordance with an exemplary aspect described herein. The network architecture 300 of FIG. 3 is similar to that of FIG. 2. FIG. 3 illustrates a plurality of service providers 302A, 302B, 302C, 302D (individually or collectively referred to herein as service provider 302). A service provider 302 is depicted as residing in a network 301, such as a packet data network (e.g., the Internet). Connectivity access network providers 314, 316, 318 (sometimes referred to as mobile network operators (MNOs)) may host sessions for client devices A-E) (i.e., client devices 304, 306, 308, 310, 312) to access services offered by the service providers 302. FIG. 3 further illustrates first and second RAN providers 332, 334. First and second RAN providers 332, 334 may host access for the client devices 304, 306, 308, 310, 312.

FIG. 3 further illustrates four exemplary serving networks, each identified by a serving network identifier. Serving network A 340 includes service provider A 302A and is identified with a first serving network identifier (serving network identifier A). Serving network B 342 includes connectivity access network provider A 314 and is identified with a second serving network identifier (serving network identifier B). Serving network C 344 includes connectivity access network provider B 316, service provider B 302B, and service provider C 302C. Serving network C 344 is identified with a third serving network identifier (serving network identifier C). Serving network D 346 includes connectivity access network provider B 316 and connectivity access network provider C 318 and is identified with a fourth serving network identifier (serving network identifier D). As stated above, a serving network may comprise one or more service providers 302, one or more connectivity access network providers 314, 316, 318, or a combination of at least one service provider and at least one connectivity access network provider; accordingly many additional combinations are possible.

Elements of Information

As used herein, a service parameter may include one or more elements of information. In other words, the service parameter may be comprised of a set of elements of information. A service parameter may be, for example, a reference to a feature or aspect of a network or a service provider.

An element of information may describe, define, and/or relate to aspects of a network or entity (e.g., connectivity access network, a service provider) associated with a serving network identifier. Evaluation of one or more elements of information may facilitate selection of a serving network associated with the serving network identifier. In one aspect, an element of information may describe one or more network capabilities supported by a network associated with a first serving network identifier. Elements of information, may be stored in storage device (e.g., a memory circuit) of an SQP server. In one aspect, the value associated with any element of information may be set by the network.

An example of a service parameter may be "Interworking". The Interworking service parameter may include a plurality of elements of information. One example of an element of information related to the interworking service parameter may be "access network type" (e.g., free public network, chargeable public network, private network, private network with guest access, personal device network). Other examples of elements of information related to the interworking service parameter may include "venue group (e.g., business, educational, outdoor) and "venue type" (e.g., stadium, museum, restaurant, private residence). Each of the above-recited elements of information are included in the examples of elements of information 406, 408, 410 presented in FIG. 4.

Figure 4:
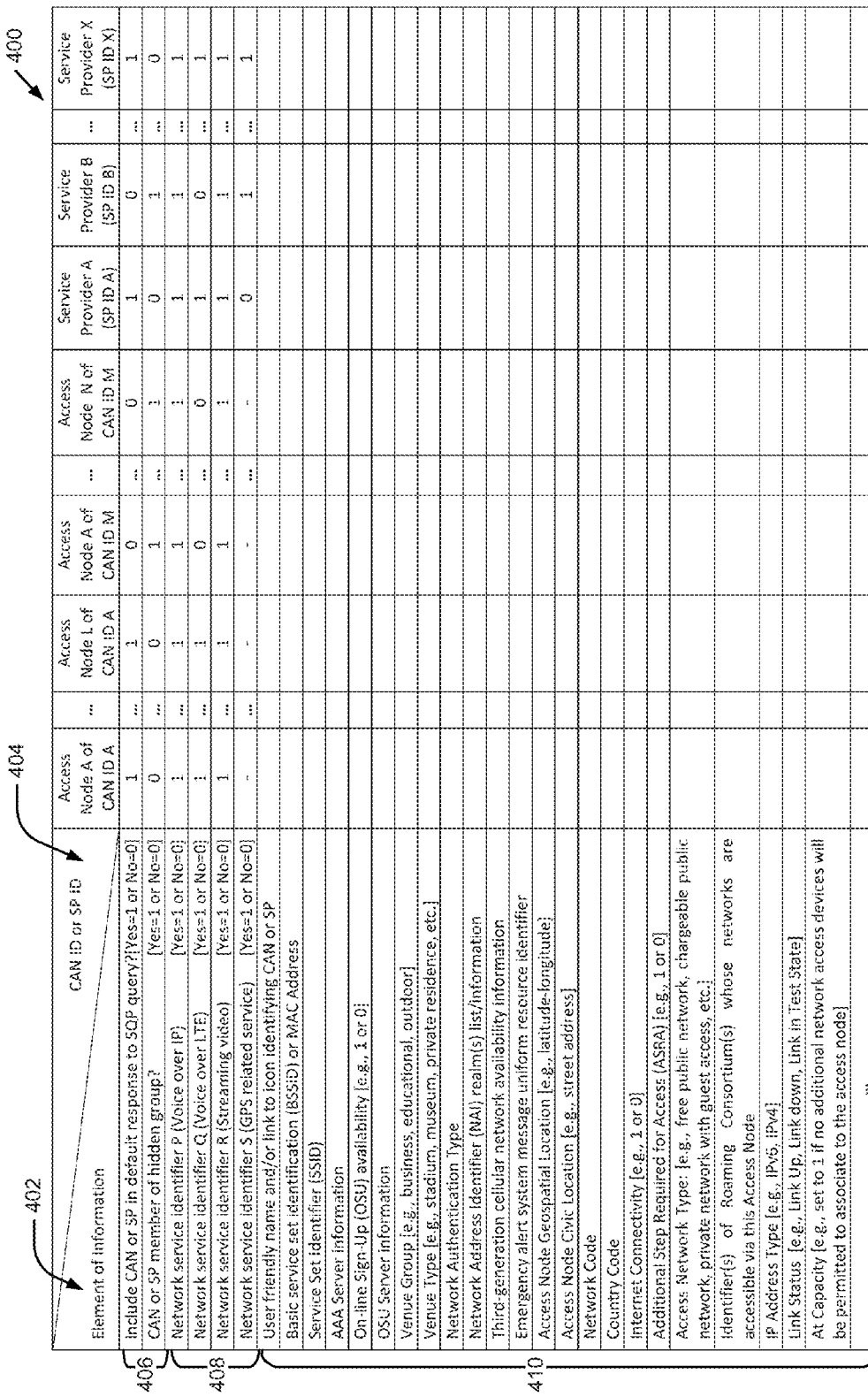
FIG. 4 is a conceptual diagram of an exemplary table that may be useful in connection with an explanation of aspects and features of elements of information as described herein.

FIG. 4 is a conceptual diagram of an exemplary table 400 that may be useful in connection with an explanation of aspects and features of elements of information as described herein. It will be understood that the data represented the table 400 of FIG. 4 may be stored in a multi-dimensional (e.g., n-dimensional where n≥2) database in a memory circuit of an SQP server (e.g., 2000, FIG. 20). Moreover, it will be understood that the data represented in the table of FIG. 4 is exemplary and non-limiting. As depicted in the table of FIG. 4, elements of information 402 are presented in rows of the table 400 while values of parameters relevant to each network access node and service provider are presented in respective columns 404 of the table 400. Table 400 is limited by space to portrayal of network access nodes A-L of connectivity access network identifier (CAN ID) A, network access nodes A-N of CAN ID M, service provider A, service provider B, and service provider X, where A, L, M, N, and X are unrelated positive integers.

The cells in the columns of data associated with elements of information identified in rows identified with reference number 410 are left blank due to space constraints and also because those of skill in the art will understand types of information that would be recorded in these cells. For example, one of skill in the art would be able to understand that a "User friendly name and/or link to icon identifying CAN or SP" may refer to a generic name of an establishment (e.g., Mike's Hot Dogs) and understands the concept and use of links to icons. A basic service set identification (BSSID) may uniquely identify each basic service set (BSS). For example, in an infrastructure BSS, the BSSID is the MAC address of the wireless access point (WAP). The concept of MAC address is well understood by those of skill in the art. A service set identifier (SSID) may be up to 32 byte identifier of an extended service set (ESS) or independent basic service set (IBSS). The SSID can be used in multiple, possibly overlapping, BSSs. AAA server information may provide an identifier for contacting the AAA server, but may also comprise alternative information as known to those of skill in the art. Online signup (OSU) availability may be used to indicate whether a network access node of service provider offers the ability to sign-up for a feature or service online. OSU server information, similar to AAA server information may provide an identifier for contacting an OSU server, but may also comprise alternative information as known to those of skill in the art. Venue group may be exemplified by whether a group is related to business, educational, outdoor activities, etc. Venue type may be exemplified by whether a venue is a stadium, a museum, a private residence, a restaurant, etc. Network authentication types are well understood by those of skill in the art. Examples include Wi-Fi protected access (WPA and WPA2), wired equivalent privacy (WEP), 802.1X authentication, secure sockets layer (SSL), IP SEC, etc.). Network access identifier (NAI) Realm list/information may provide a NAI realms corresponding to SSPs or other entities whose networks or services are accessible via a network access node and other information such as a list of one or more extensible authentication protocol (EAP) method subfields, which that NAI realm uses for authentication may be set forth in the table 400. Third-generation cellular network availability information may contain cellular information such as network advertisement information e.g., network codes and country codes to assist a 3GPP non-AP STA in selecting an AP to access 3GPP networks as defined in Annex A of 3GPP TS 24.234. The emergency alert system message uniform resource identifier should be understood by those of skill in the art. Access node geospatial location is understood as coordinates in latitude-longitude. Access node civic location may be a street address. The table 400 may identify whether a given network access node or service provider gives Internet connectivity. In connection with interworking, the table 400 may indicate whether an access network requires an additional step required for access (ASRA) indicator. The table 400 may identify the type of access network (e.g., free public network, chargeable public network, private network with guest access, etc.). The table 400 may record identifiers of roaming consortium(s) whose networks are accessible via this network access node. It may identify IP address type (e.g., IPv6, IPv4). The table 400 may identify link status (e.g., whether the link is up, down, or in a test state). Among other things, the table 400 may identify whether the network access node is at capacity by indicating, for example, if no additional client devices will be permitted to associate to the network access node. Many other elements of information may be stored in the table 400 of FIG. 4.

Each service provider and/or network access node may be selectively identified in a response to a request for a default list of service providers and/or network access nodes and may also be selectively identified as being hidden, so as to have the identifier of the service provider and/or network access node omitted from public broadcast (e.g., broadcast in a beacon signal). The first two rows 406 of the table 400 of FIG. 4 illustrate one way in which such identification may be accomplished. The indication of whether a given service provider and/or network access node is included in a default group or a hidden group may be represented with one or two flags. Using two flags, the first flag could identify inclusion in a default group and the second flag could identify inclusion in a hidden group. Because a service provider and/or network access node cannot be a part of both the default and hidden groups, the flags will typically be set for either the default or the hidden group, but not both. Accordingly, it may also be possible to use one flag, set to a first state to indicate inclusion in the default group and a second state to indicate inclusion in the hidden group. Other methods of indicating inclusion in a given group are acceptable within the aspects described herein. The values identified in the first two rows 406 of table 400 of FIG. 4 may be useful in connection with queries identified as belonging to the first mode of query, described in aspects presented herein. When a query is configured according to a first mode of a plurality of modes and when an element of information included with the query is a null-value, the first two rows 406 of table 400 of FIG. 4 may facilitate preparation of the response to the query (which may be referred to as the "default response" herein). Accordingly, the values (1 or 0) assigned to the cells of the first two rows 406 of table 400 of FIG. 4 may be used to identify the connectivity access networks and/or service providers that want/do not want to be included in the default response as well as those that want/do not want to hide their identities from network access node capability broadcasts.

As depicted in FIG. 4, the table 400 may identify services associated with each service provider and/or network access node of a connectivity access network (see, e.g., rows associated with reference number 408), where identifiers of network services are listed. For example, and for exemplary and non-limiting purposes only, network service identifier P may be used to indicate availability of a voice over IP service, network service identifier Q may be used to indicate availability of a voice over LTE service, network service identifier R may be used to indicate availability of a streaming video service, and network service identifier S may be used to indicate availability of a global positioning system (GPS) service. Other non-limiting exemplary services may include, for example, carrier aggregation and use of multiple input multiple output antenna service are within the scope of the described aspects.

Additional elements of information associated with the network access nodes and/or service providers (see, e.g., rows associated with reference number 410) may include, but not are not limited to: name, icon, and/or other type of identification of connectivity access network provider(s)/service provider(s) associated with the network access node; information related to an authentication, authorization, and accounting (AAA) server (e.g., AAA server of network access node, connectivity access network, and/or service provider); availability of online sign-up (OSU); and OSU server information; venues associated with the network access node (e.g., venue groups and/or venue types); network authentication types required by or available with the network access node (e.g., acceptance of terms and conditions, on-line enrolment supported, HTTP/S redirection, DNS redirection); network address identifier (NAI) realms information (e.g., identification of NAI realm(s) accessible through the network access node); information about third-generation mobile telephony cellular networks available through the network access node; emergency alert system (EAS) message uniform resource identifiers (URIs); and emergency calling instructions including, for example, telephone numbers, and the geospatial and civic locations of the network access node; network code; country code; Internet connectivity (e.g., availability); network access node and/or connectivity access network type (e.g., free public network, chargeable public network, private network with guest access, personal device network, etc.), identifier(s) of roaming consortium(s) whose networks are accessible via the network access node; IP address type (e.g., IPv6, IPv4); link status (e.g., link up, link down, link in test state); at capacity (e.g., set to 1 if no additional client devices will be permitted to associate to the network access node); downlink (DL) speed (e.g., backhaul link downlink speed in kbps); and uplink (UL) speed (e.g., backhaul link uplink speed in kbps). Elements of information may additionally or alternatively include, but are not limited to, over-the-air information elements (IEs) that may typically be associated with IEEE standards such as: basic service set identification (BSSID) and service set identifiers (SSIDs). Although some or all of the name provided for the elements of information may be the same or similar to names of information elements defined for IEEE ANQP, the identity or similarity is coincidental and not intended to limit any definition or use of any elements of information described herein.

The element of information may be identified in a query by a set of characters that includes a wildcard character. Multiple wildcard characters are also acceptable. In accordance with one aspect, a wildcard character may represent any of the characters in the set of characters. Accordingly, a query using one or more wildcard characters may desirably cause the query to include a plurality of results. As will be understood, a wildcard character may serve as a substitute for any other character in a string. For example, a search including an element of information such as "voice over *" (where * represents a wildcard character) may return results relevant to "voice over IP" and "voice over LTE" for example.

The network access node may be directly associated with a serving network identified by the first serving network identifier. In accordance with some aspects, the one or more elements of information may be used to determine services supported by the serving network. The one or more elements of information may define at least one capability of the serving network, where the at least one capability of the serving network may include, but is not limited to service provider identification (SPI), type of authentication, availability of online sign-up (OSU), OSU server information, and/or authentication, authorization, and accounting (AAA) server information. In accordance with some aspects, the service provider identification (SPI) may include provision of a name of a service provider and/or an icon representative of the service provider, wherein the name and icon are provided in a format for display on a display screen of a client device. In some aspects, the one or more elements of information may include a limitation on one capability of the serving network.

A client device may receive the plurality of serving network identifiers from the network access node prior to determining to obtain the service parameter. Receipt may be accomplished via a wireless communication between the client device and the network access node. In some aspects, the plurality of network identifiers may be received at the client device, in a wireless communication between the client device and the network access node, from a message broadcast from the network access node or from a unicast message from the network access node. In some aspects, the serving network identifier is a service set identifier (SSID), a public land mobile network identifier (PLMN ID), a service provider identifier (SPI), or a network access identifier (NAI) realm.

Selecting the first serving network identifier from the plurality of serving network identifiers may be based on whether a preexisting relationship is established between the client device and a serving network identified by the first serving network identifier. There may be a preference to select the serving network with a preexisting relationship. A preexisting relationship may be established when the client device has a subscription with the serving network identified by the first serving network identifier and/or when the first serving network identifier is included on a preexisting list of preferred serving networks configured in the client device. Other ways to select the first serving network identifier are acceptable.

In some aspects, determining the first serving network identifier may include selecting the first serving network identifier from the plurality of serving network identifiers based on a subscription status held by the UE device with the first serving network. In some aspects, a subscription between the first serving network and the client device may be entered into or updated via wireless communication. In some aspects, the query may include an access network query protocol (ANQP) query on a wireless local area network (WLAN) or may include a non-access stratum (NAS) or radio resource control (RRC) message. In some aspects, the first and second serving network identifiers may identify different servers and/or may represent two types of serving network identifiers.

In some aspects, a client device may use a serving network identifier (examples of serving network identifier types include a service set identifier (SSID) type identifier, a public land mobile network identifier (PLMN ID) type identifier, a service provider identifier (SPI) type identifier, and a network access identifier (NAI) realm type identifier) that the device has selected to connect to, or desires to connect to, as part of an SQP query to direct the query to a specific SQP server when RAN sharing is advertised by the network access node. This allows a network access node to be associated with multiple service providers, each providing different services/features/characteristics at the network access node. Upon receiving an SQP query including a serving network identifier, the network access node may determine whether there is a server (e.g., ANQP/SQP server) associated with the serving network identifier. If there is a server, the network access node may route the query to the related server, and routes a response from the server to the network access node. If there is no associated server, the network access node may route the query to a default server. Upon receiving a query including a serving network identifier that does not correspond to the service provider that operates/provisions the default server, the default server may reply to the query adding an indication that the response is not specific to the service provider identified by or associated with the received serving network identifier.

Service Query Protocol (SQP)

In accordance with aspects described herein, a protocol, referred to herein as a Service Query Protocol (SQP) may be defined to enable a client device (e.g., a UE, a STA, a terminal) to discover information related to a network access node (e.g., an AP, an eNB) and/or a serving network of the network access node. In some aspects, SQP may enable a device to discover the service providers and other service information for the serving networks of a network access node. As used herein, the serving network of a network access node may include all connectivity access network providers/service providers that are associated with, or share, the network access node. SQP may be useful in all operational environments, but may be particularly useful in environments where the serving network includes a plurality of connectivity access network providers, each hosting one or more services/service providers.

SQP may have several characteristics. A first characteristic may be that an SQP query need only be run once in connection with each connectivity access network (up to a validity time). In other words, the information associated with an SQP query may not be valid indefinitely. The information may be associated with an expiry time. That is, it may be defined as being valid up to a certain time, which could be absolute (e.g., valid until Monday at 9 pm) or relative (e.g., valid for the next 3 hours). Each connectivity access network may be identified by a connectivity access network identifier (CAN ID). Examples of CAN ID may include, for example, service set identifier (SSID), public land mobile network identifier (PLMN ID), service provider identifier (SPI), and network access identifier (NAI) realm type identifier. The SQP query may only need to be run once to determine, for example, if the client device has a valid subscription associated with a given connectivity access network, or to provision a new subscription at a new/unrecognized connectivity access network. The characteristic that SQP queries need only be run once in connection with each connectivity access network may be evident when considering, for example, a first SQP query made at a first network access node. At the first network access node, if the device sends an SQP query to determine the services associated with a given CAN ID associated with the first network access node, then the client device can assume that the same services are available at all other network access nodes associated with the same CAN ID, up to some granularity. The concept of granularity, as described in this aspect, may be exemplified using tracking area (TA). As known to those of skill in the art, a tracking area may define one or more eNBs. Thus, granularity in this context may imply a geographic area. Nothing herein is intended to limit the concept of granularity to this example. Any identifier or acronym, popular now or in the future, may be used instead of TA to identify eNBs from which the same services are available. Alternatively, a list of eNBs, from which the same services are available, could be provided in a response to an SQP query.

A second characteristic may be that the SQP may also include support for subscription identification. For example, in response to an SQP query requesting subscription identification, a response indicative of the existence of a valid subscription could be received at a device. The response may include, for example, a name and/or an icon that could be displayed on a screen of the client device. The name and/or icon could be used to identify a RAN provider, connectivity access network provider, and/or service provider to which the device would couple.

Additionally, SQP may provide a client device with information on types of provisioning available to the device. For example, a client device could be able to use SQP to sign-up for a new service on an already subscribed-to connectivity access network. Additionally or alternatively, the device may provision a new subscription at a new or unrecognized connectivity access network. Such provisioning may be referred to as online signup (OSU).

A third characteristic may be that SQP may be implemented in, or made operational over, an unauthenticated non-access stratum (NAS) or radio resource control (RRC) connection. Accordingly, if a client device does not have a subscription for a connectivity access network identified by a particular CAN ID, the client device can nevertheless use SQP to determine what services are available from the connectivity access network without having to first attach to the connectivity access network. If the client device determines that it does not have a subscription, but seeks to obtain services offered through the connectivity access network identified by the particular CAN ID, then the client device can acquire a subscription through, for example, OSU as described above.

A fourth characteristic may be that SQP may be used to obtain information related to a network access node by a client device instead of, or in addition to, obtaining information about the network access node from beacons or broadcasts sent from the network access node (e.g., system information blocks (SIBs) broadcast by the network access node). The information obtained may be related to service parameters in general or to elements of information that may be aspects of, or components of, the service parameters.

The information obtained in response to an SQP query may be useful to the client device at least because the client device determined a need to query the network access node for the information. In other words, unlike an unrequested SIB, which may contain information not needed by the client device, a response to an SQP query would typically include only information needed by the client device (given that it was the client device that formulated the SQP query and therefore presumably needed the information).

The fourth characteristic may make it easier to extend support to future requirements and services. For example, in both cellular LAN (e.g., 3GPP LTE) and WLAN (e.g., IEEE 802.11), a network access node typically broadcasts basic information about the network(s) supported by the network access node (e.g., using beacons such as SIBs). To broadcast any more information would be an inefficient use of resources, including resources of bandwidth, time, and energy. However, by using SQP, a great deal of information can be provided from the network access node to the client device—but only to the client device that requested that information and only that information that the client device determined was needed.

Each network (for example, MME for NAS and eNB for RRC) may be configured with one or more service providers and/or MNOs that provide access via the network. For each service provider/MNO, information about how to obtain access is configured or available (e.g., via DNS lookup, etc.):

Service provider:
Service provider identification (e.g., name, icon);
Type of authentication;
AAA Server information; and
Availability of online sign-up (OSU), and OSU server information.

This information may be available to the client device via SQP query/response.

SQP data, such as service parameters and elements of information related to the service parameters may be stored in memory devices associated with SQP servers.

Connectivity Access Network Identifier (CAN ID)

In the aspects described herein, the term connectivity access network identifier (CAN ID) may have several characteristics. A first characteristic may be that the CAN ID may be broadcast over-the-air. That is, a client device may not need to attach to a network access node to identify a connectivity access network sharing the network access node. Nor must the client device send a probe request to retrieve the CAN ID in a probe response. However, the uses of probe requests/responses are within the scope of the aspects described herein.

A second characteristic of the CAN ID may be that it may indicate an operator of the connectivity access network and/or the eNB.

A third characteristic may be that the CAN ID may either implicitly indicate a deployment model based on the type of network identifier, (e.g. a public land mobile network (PLMN) ID type identifier may indicate a traditional, or cellular, network operator (e.g., a 3GPP LTE network operator that, for example, implements RAN sharing), whereas a different type of identifier may indicate a network that is not associated with a PLMN ID (e.g., a non-traditional, IEEE 802.11 or Hotspot 2.0 network operator, that, for example, may also implement RAN sharing), or the CAN ID may explicitly contain an indication of the deployment model type of network.

A network access node in a RAN may support more than one CAN ID. Support of multiple CAN IDs may be used to implement RAN sharing on IEEE 802.11, Hotspot 2.0, and other types of systems that heretofore were not known to support RAN sharing. A second reason may be to support different types of identifiers on a network access node; for example, a given network access node might advertise both a public ID and a private ID. A private ID might be useful, for example, for an individual that wishes to connect client devices in his or her home to a network that is not accessed by others. The public ID might be useful for the same individual that wishes to provide Internet access to guests. The separate CAN IDs for private and public networks associated with one network access node may permit the use of separate SQP servers for each connectivity access network or the aspects of the serving network associated with a given network access node. Separate SQP servers may be useful, as a user may wish to make more services available on the private network than on the public network.

A network access node (e.g., eNB, AP) should be able to support serving network identifiers for private and public use, as well as for RAN sharing. For example, a network access node should be able to advertise multiple access networks, as for RAN sharing, but also may be able to advertise a secondary ID, similar to a closed subscriber group ID (CSG ID), to indicate a private access network that is also part of a public access network.

Each CAN ID may be associated with a separate SQP server. In this way, a network access node could provide a first set of services from a first service provider via a first CAN ID and a second set of services from a second service provider via a second CAN ID, where both CAN IDs might be broadcast, or obtained via probe request/response, from the network access node.

A network access node (e.g., eNB, AP) may not be required to be associated with a PLMN in order to support non-operator deployments. For example, the network access node may advertise an alternative ID to identify an access network provider. This alternative ID may be similar to a service set identifier (SSID) in that it is not a managed ID and so may not be unique to the access network.

Transport of SQP queries, such as the above identified SQP queries that may be configured according to one of a plurality of modes, will now be described. Such SQP queries may be useable by various types of networks. Generally, SQP queries may be transported in the control plane using NAS transport or RRC transport.

Network Architectures Incorporating SQP

According to aspects described herein, each network access node (e.g., eNB/AP) may be associated with one or more connectivity access networks (e.g., mobile network operators (MNOs)). Each connectivity access network may be configured with one or more service providers. Access by a client device to the service providers may be obtained via a network access node. For each connectivity access network/service provider, information about how to obtain access may be configured, or is available (e.g., via a domain name system (DNS) lookup, etc.), to the client device. The connectivity access network/service provider information may include, for example: CAN ID/SP ID identification (e.g., name, icon); type of authentication; authentication, authorization, and accounting (AAA) server, availability of online signup (OSU); and/or OSU server information. This information may be available to a client device via SQP query/response.

Figure 5:
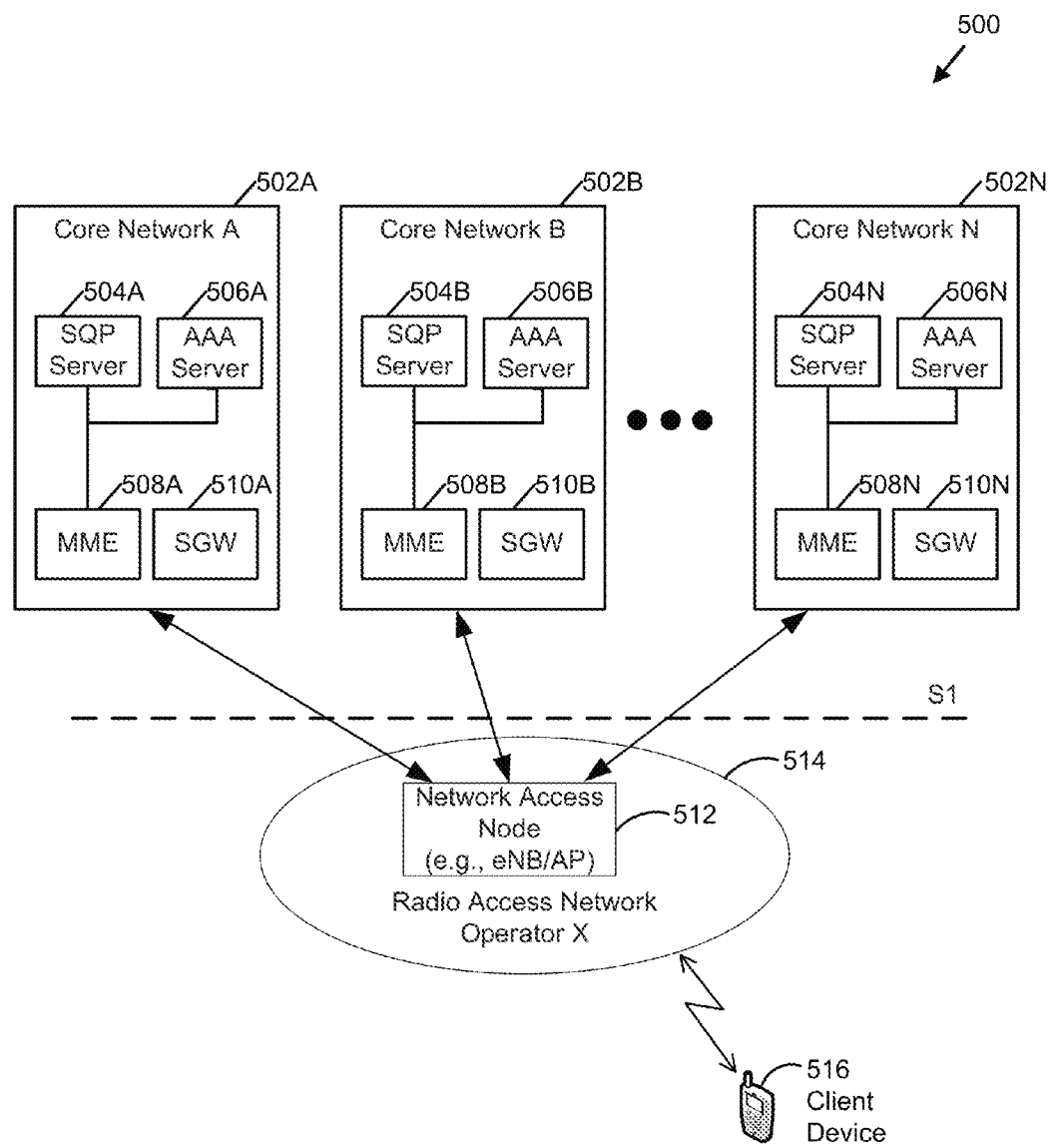
FIG. 5 illustrates a first network architecture that facilitates use of a service query protocol.
Figure 6:
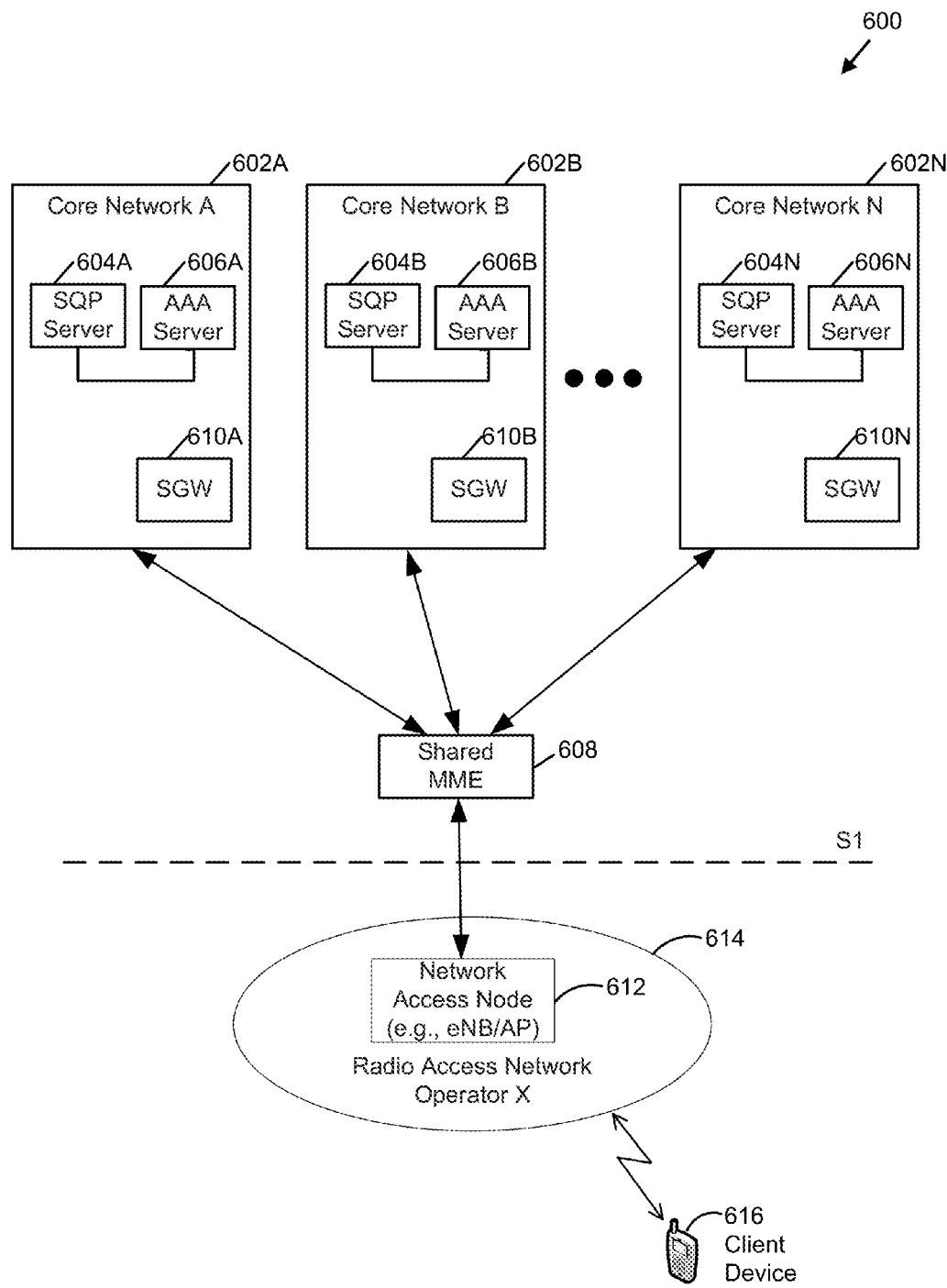
FIG. 6 illustrates a second network architecture that facilitates use of the service query protocol.
Figure 7:
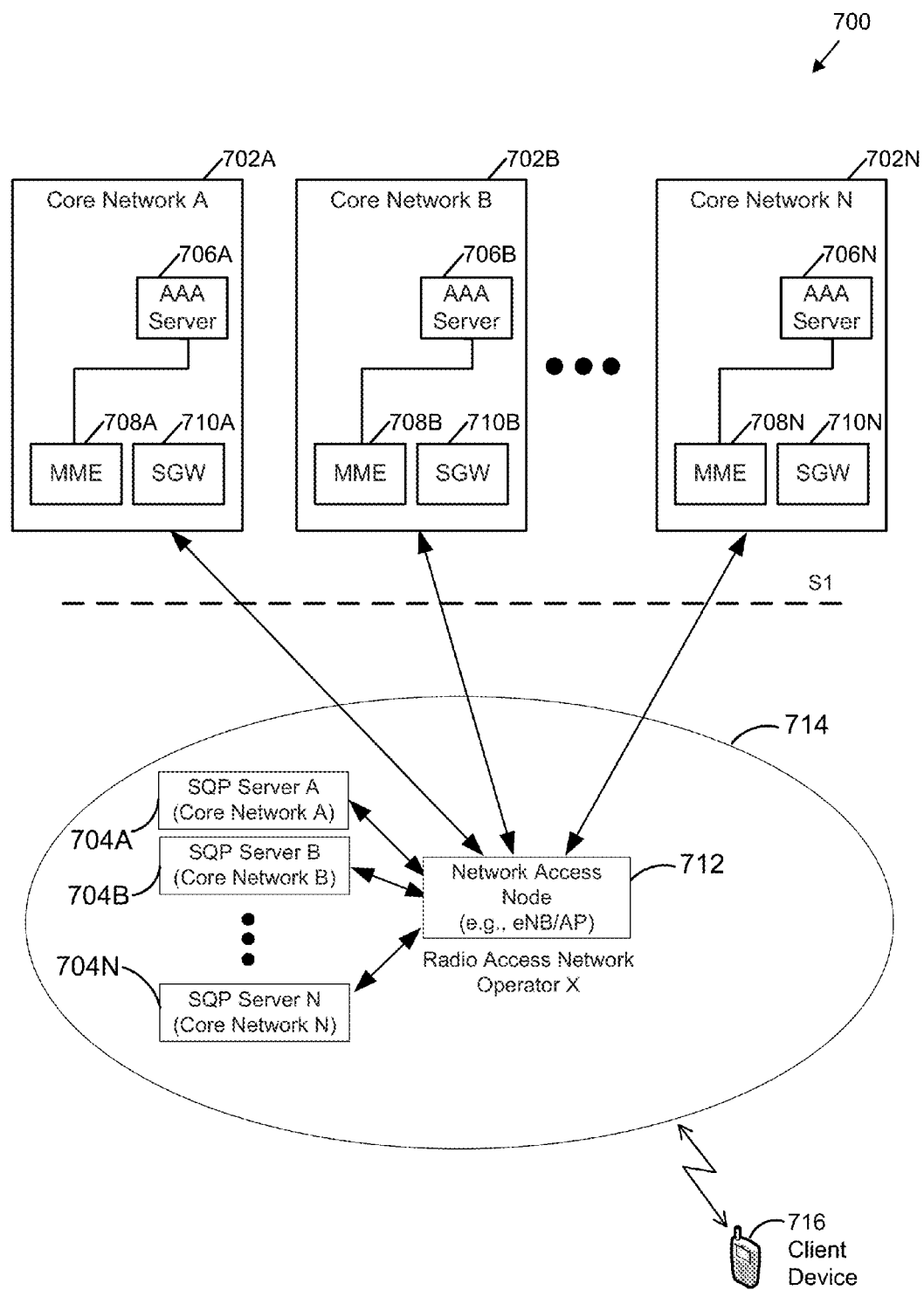
FIG. 7 illustrates a third network architecture that facilitates use of the service query protocol.

FIGS. 5, 6, and 7 illustrate first, second, and third aspects of network architectures in accordance with exemplary aspects described herein. Nothing, however, restricts a possibility of additional/alternative aspects of network architecture. For ease of illustration, a connectivity access network provider and its service providers are represented in combined form and identified by blocks labeled Core Network A, Core Network B, . . . , Core Network N, where N is a positive integer.

The exemplary aspects may find applicability in next generation (5G) network architectures but are not limited thereto. The exemplary aspects may be useful for a client device to determine available wireless network services/service providers using SQP queries. FIG. 5 illustrates a first network architecture 500 that facilitates use of a service query protocol. FIG. 6 illustrates a second network architecture 600 that facilitates use of the service query protocol. FIG. 7 illustrates a third network architecture 700 that facilitates use of the service query protocol. The network architectures of FIG. 5, FIG. 6, and FIG. 7 enable incorporation of SQP for all types of network access nodes (e.g., 3GPP LTE eNBs, IEEE 702.11 APs). The terminology used herein is exemplary and not intended to be limiting. For example, use of the term mobility management entity (MME) is not meant to limit the scope to network architectures that use entities so named. The same or similar functionalities of MMEs illustrated in FIGS. 5, 6, and 7 may be implemented in other networks under one or more different names. Use of differently named entities, which perform the same or similar functionalities as, for example, the MMEs illustrated in FIGS. 5, 6, and 7, are also contemplated herein. Additionally, it will be understood that several components of a typical communication system are omitted from FIGS. 5, 6, and 7 to avoid cluttering the drawings.

Each of FIG. 5, FIG. 6, and FIG. 7 includes at least one MME and serving gateway (SGW). For conciseness, the MME and SGW are described in connection with FIG. 5, so as to avoid repeating the same or similar descriptions in connection with FIG. 6 and FIG. 7.

FIG. 5 relates to an exemplary aspect referred to herein as a Gateway Core Network (GWCN) architecture 500 for network sharing. Each core network 502A, 502B, . . . , 502N includes its own SQP server 504A, 504B, . . . , 504N. As illustrated, each core network 502A, 502B, . . . , 502N also includes its own AAA server 506A, 506B, . . . , 506N, MME 508A, 508B, 508N, and SGW 510A, 510B, . . . , 510N.

According to the first example of network architecture, each of the AAA servers 506A, 506B, . . . , 506N may be thought of as a circuit/function/module that may service requests from client devices for access to computer resources and may provide authentication, authorization, and accounting services. Aspects of authentication, authorization, and accounting services are understood by those of skill in the art. A AAA server 506A, 506B, . . . , 506N may typically interact with network access and gateway servers and with databases and directories containing user information. Each of the MME 508A, 508B, . . . , 508N may be responsible for tracking and paging procedures including retransmissions, and also for the idle mode of a client device (e.g., client device 520). Each of the MME 508A, 508B, . . . , 508N may also be involved in bearer activation and deactivation procedures. Each of the MME 508A, 508B, . . . , 508N may also be responsible for client device authorization to public land mobile networks (PLMNs) and enforcing client device roaming restrictions, if any. Each SGW 510A, 510B, . . . , 510N is a gateway. Each client device (e.g., client device 516) may be associated with a one SGW 510A, 510B, . . . , 510N at one time. Each SGW 510A, 510B, . . . , 510N may be responsible for handovers with neighboring network access nodes. Each SGW 510A, 510B, . . . , 510N also may maintain context information related to a client device (e.g., 516) when the client device is in an idle state.

FIG. 5 illustrates a network access node 512 (e.g., eNB/AP) coupled to N core networks 502A, 502B, . . . , 502N in accordance with aspects described herein. Although only one network access node 512 is illustrated in the RAN 514, it will be understood that the RAN 514 may include a plurality of network access nodes. The network access node 512 may be identified by a unique identifier. The S1 interface, between the Evolved UMTS Terrestrial Radio Access Network (EUTRAN) and the Evolved Packet Core (EPC), is depicted as a dashed line between the RAN 514 and each of the core networks 502A, 502B, . . . , 502N. Again, usage of terminology associated with a given communication standard is not intended to limit the scope to that particular communication standard.

FIG. 5 relates to utilization of an SQP server in communication with a non-access stratum (NAS) layer of a protocol stack. A description of an exemplary protocol stack is provided herein.

In accordance with GWCN architecture 500, in the aspects described herein, a client device 516 may identify an intended destination of an SQP query message to the network access node 512 by use of the destination's serving network identifier. A serving network identifier may be, for example, a service set identifier (SSID), a public land mobile network identifier (PLMN ID), a service provider identifier (SP ID), or a network access identifier (NAI) realm.

For example, the client device 516 may identify the serving network identifier of SQP server 504B of core network B 502B as the intended destination. The network access node 512 may then forward the SQP query message to the NAS layer (e.g., 812, FIG. 8) of the MME protocol stack (e.g., 808, FIG. 8) of the MME 508B. The NAS layer (e.g., 812, FIG. 8) may transfer the SQP query message to the SQP layer (e.g., 806, FIG. 8) in the SQP server (e.g., 814, FIG. 8) of the MME 508B. In this way, an SQP query that includes a serving network identifier may be sent from any type of network access node that supports RAN sharing. Use of the serving network identifier in the SQP query supports RAN sharing in network access nodes that have heretofore only supported one connectivity access network provider/service provider (e.g., APs operating according to IEEE 702.11, Wi-Fi, or Hotspot 2.0). By incorporating the serving network identifier into the SQP query, the network access node may direct the SQP query to a desired SQP server from among a plurality of SQP servers. Accordingly, in GWCN architecture 500, the network access node 512 may determine where to send the packets of an SQP query message based on the serving network identifier included in the SQP query message.

FIG. 6 relates to an exemplary aspect referred to herein as a Multi-Operator Core Network (MOCN) architecture 600 for network sharing. Each core network 602A, 602B, . . . , 602N includes its own SQP server 604A, 604B, . . . , 604N, where N is a positive integer. As illustrated in the aspect of FIG. 6, MOCN architecture 600 utilizes a shared MME 608, which is shared between the core networks 602A, 602B, . . . , 602N of the MOCN architecture 600 model. The core networks 602A, 602A, . . . , 602N are coupled to the shared MME 608.

FIG. 6 illustrates a network access node 612 coupled to a plurality of core networks 602A, 602A, . . . , 602N via the shared MME 608 in accordance with aspects described herein. Although one network access node 612 is illustrated in the RAN 614, it will be understood that the RAN 614 may include a plurality of network access nodes. The S1 interface, between the EUTRAN and the EPC is depicted as a dashed line between the RAN 614 and the shared MME 608. Again, usage of terminology associated with a given communication standard is not intended to limit the scope to that particular communication standard.

The aspect of FIG. 6 pertains to utilization of an SQP server in communication with a non-access stratum (NAS) layer of a protocol stack. A description of an exemplary protocol stack is provided herein.

In accordance with MOCN architecture 600, in the aspects described herein, a client device 616 may identify an intended destination of an SQP query message to the network access node 612 by use of the destination's serving network identifier. A serving network identifier may be, for example, a service set identifier (SSID), a public land mobile network identifier (PLMN ID), a service provider identifier (SP ID), or a network access identifier (NAI) realm.

For example, the client device 616 may identify the serving network identifier of SQP server 604B of core network B 502B as the intended destination. The network access node 612 may then forward the SQP query message to the NAS layer (e.g., 812, FIG. 8) of the MME protocol stack (e.g., 808, FIG. 8) of the shared MME 606. The NAS layer (e.g., 812, FIG. 8) may transfer the SQP query message to the SQP layer (e.g., 806, FIG. 8) in the SQP server (e.g., 814, FIG. 8) of core network B 502B. In this way, an SQP query that includes a serving network identifier may be sent from any type of network access node that supports RAN sharing. Use of the serving network identifier in the SQP query supports RAN sharing in network access nodes that have heretofore only supported one connectivity access network provider/service provider (e.g., APs operating according to IEEE 702.11, Wi-Fi, or Hotspot 2.0). By incorporating the serving network identifier into the SQP query, the network access node may direct the SQP query to a desired SQP server from among a plurality of SQP servers. As stated above, in MOCN the MME 608 is shared. Accordingly, in MOCN architecture 600, the shared MME 608 may determine where to send the packets of the SQP query based on the serving network identifier included in the SQP query message.

FIG. 7 relates to an exemplary aspect referred to herein as a Second Core Network architecture 700 for network sharing. In the Second Core network architecture 700, a network access node 712 may be coupled to a plurality of SQP servers 704A, 704B, ..., 704N, where each of the plurality of SQP servers 704A, 704B, ..., 704N includes data for a respective core network 702A, 702B, 702N. The exemplary illustration of FIG. 7 relates to utilization of SQP servers 704A, 704B, ..., 704N that reside within a given RAN 714. As with the GWCN architecture 500 and MOCN architecture 600 described above in connection with FIG. 5 and FIG. 6, each connectivity access network provider/MNO may have its own SQP server. Nevertheless, it will be understood that while N SQP servers 704A, 704B, ..., 704N are illustrated in FIG. 7, the content of the N SQP servers 704A, 704B, ..., 704N could be included in fewer than N SQP servers. For example, the plurality of SQP servers 704A, 704B, ..., 704N may be implemented as a plurality of logical SQP servers, where a physical server may be logically subdivided into the plurality of logical SQP servers.

In the exemplary aspect of FIG. 7, the SQP servers 704A, 704B, ..., 704N (e.g., implemented as logical or physical servers) reside in the RAN 714 with a network access node 712. In LTE terms, the SQP servers 704A, 704B, ..., 704N reside in the Evolved UMTS Terrestrial Radio Access Network (EUTRAN) side with the eNB, not on the Evolved Packet Core (EPC) side of a network. Again, usage of terminology associated with a given communication standard is not intended to limit the scope to that particular communication standard.

FIG. 7 illustrates a network access node 712 that is coupled to N core networks 702A, 702B, ..., 702N in accordance with aspects described herein. Communication may take place by messaging transported over an RRC layer or an NAS layer as described above. The S1 interface, between the EUTRAN and the EPC is depicted as a dashed line between RAN 714 and the core networks 702A, 702B, ..., 702N.

Although only one network access node 712 is presented as being included in the RAN 714, it will be understood that the RAN 714 may include a plurality of network access nodes.

In accordance with Second Core Network architecture 700, in the aspects described herein, a client device 716 may identify an intended destination of an SQP query message to the network access node 712 by use of the destination's serving network identifier. The destination's serving network identifier may be associated with its respective SQP server 704A, 704B, ..., 704N residing in the RAN 714. A serving network identifier may be, for example, a service set identifier (SSID), a public land mobile network identifier (PLMN ID), a service provider identifier (SP ID), or a network access identifier (NAI) realm.

For example, the client device 716 may identify the serving network identifier of SQP server 704B of core network B 702B as the intended destination. The SQP query may be transported across the RRC layer from RRC layer (e.g., 910, FIG. 9) of the client device 716 to RRC layer (e.g., 912, FIG. 9) of the network access node 712 (e.g., ENBU/AP protocol stack 908, FIG. 9). The RRC layer (e.g., 912, FIG. 9) may transfer the SQP query message to the SQP layer (e.g., 906, FIG. 9) in the SQP server 704B (e.g., 914, FIG. 9) associated with core network B 702B. In this way, an SQP query that includes a serving network identifier may be sent from any type of network access node that supports RAN sharing. Use of the serving network identifier in the SQP query supports RAN sharing in network access nodes that have heretofore only supported one connectivity access network provider/service provider (e.g., APs operating according to IEEE 702.11, Wi-Fi, or Hotspot 2.0). By incorporating the serving network identifier into the SQP query, the network access node may direct the SQP query to a desired SQP server from among a plurality of SQP servers. In the case of Second Core Network architecture 700, transport may occur on the RRC layer. Accordingly, in Second Core Network architecture 700, the network access node 712 may determine where to send the packets of the SQP query message based on the serving network identifier included in the SQP query message.

Because the core networks 702A, 702B, ..., 702N could be using either GWCN architecture 500 or MOCN architecture 600, the Second Core Network architecture 700 could also correspond to GWCN architecture 500 or MOCN architecture 600.

Exemplary Control Plane Protocol Stacks

Figure 8:
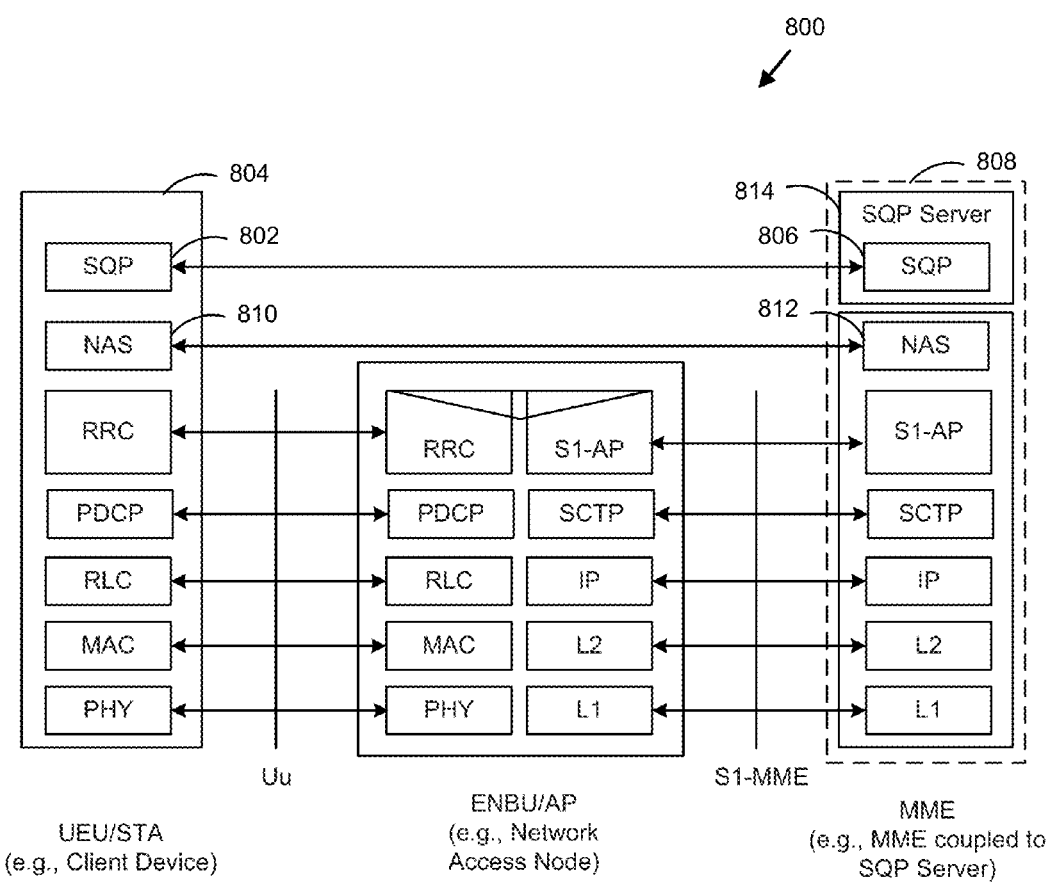
FIG. 8 illustrates control plane protocol stacks of a network in accordance with an exemplary aspect.

SQP signaling may be performed over NAS transport. FIG. 8 illustrates control plane protocol stacks 800 of a network in accordance with an exemplary aspect. In one aspect, the network may be a next generation (5G) network. In comparison to known protocol stacks, SQP layer 802, 806 may be new or may have a new use. Alternate names for this layer are acceptable. The SQP layer 802 implemented in the UEU/STA stack 804 is at the same level as the SQP layer 806 implemented in the MME protocol stack 808. The SQP layer 802 implemented in the UEU/STA stack 804 is higher than the NAS layer 810 in the UEU/STA stack 804. The SQP layer 806 implemented in the MME protocol stack 808 is higher than the NAS layer 812 in the MME protocol stack 808.

The protocol stacks of FIG. 8 may be for an SQP query/response between a client device and an SQP server 814 over NAS layer 810, 812. FIG. 8 illustrates SQP layer 806 within an SQP server 814. This illustration is meant to depict an association of the SQP layer 806 of a first RAN provider (or connectivity access network provider) with an SQP server 814 that is uniquely associated with the first RAN provider (or connectivity access network provider). It is not meant to identify a protocol stack layer named "SQP Server."

Figure 9:
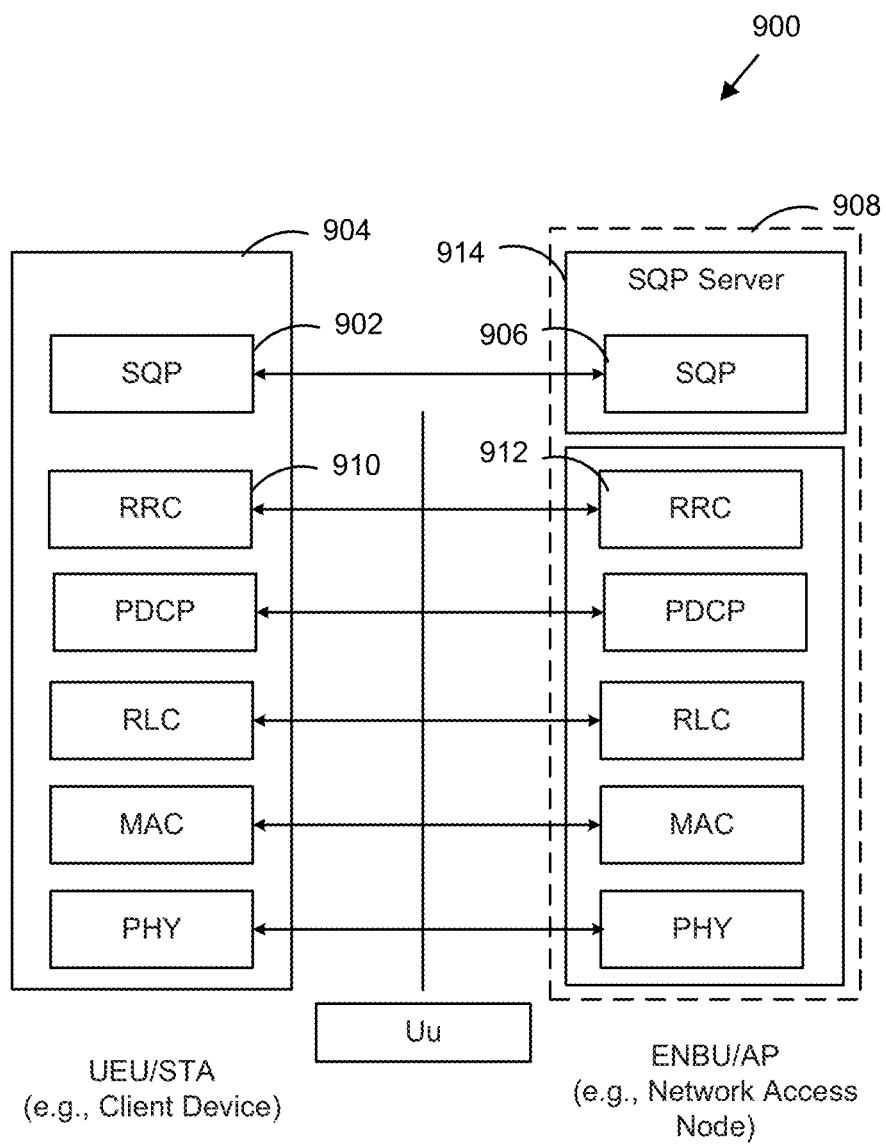
FIG. 9 illustrates control plane protocol stacks of a network in accordance with another exemplary aspect.

As an alternative, SQP signaling may be performed over RRC transport. FIG. 9 illustrates control plane protocol stacks 900 of a network in accordance with another exemplary aspect. In one aspect, the network may be a next generation (5G) network. In comparison to known protocol stacks, the Service Query Protocol (SQP) layer 902, 906 is new or is used in a new way. Alternate names for this layer are acceptable. The SQP layer 902 implemented in the UEU/STA stack 904 is at the same level as the SQP layer 906 implemented in the network access node (e.g., ENBU/AP) protocol stack 908. The SQP layer 902 implemented in the UEU/STA stack 904 is higher than the RRC layer 910 in the UEU/STA stack 904. The SQP layer 906 implemented in the network access node (e.g., ENBU/AP) protocol stack 908 is higher than the RRC layer 912 in the network access node (e.g., ENBU/AP) protocol stack 908.

The protocol stacks of FIG. 9 may be for an SQP query/response between a client device and an SQP server 914 over RRC layer 910, 912. FIG. 9 illustrates SQP layer 906 within an SQP server 914. This illustration is meant to depict an association of the SQP layer 906 of a first RAN provider (or connectivity access network provider) with the SQP server 914 that is uniquely associated with the first RAN provider (or connectivity access network provider). It is not meant to identify a protocol stack layer named "SQP Server."

Two exemplary alternatives exist in implementation of the SQP over RRC protocol stack as illustrated in the aspect of FIG. 9. Each alternative is explained below.

According to a first alternative aspect, a client device may establish an RRC connection with a network access node. As understood from previous discussions, the network access node may be exemplified by, for example, an eNB or an AP. According to the first alternative aspect, the client device may establish the RRC connection with the network access node with a cause code identified as/named "SQP query". The network access node may reply to the SQP query with an "SQP response" containing the information requested by the client device in the SQP query.

According to a second alternative aspect, new initial RRC messages identified as/named "RRC SQP Query" and "RRC SQP Response" may be utilized for a device to perform "Service Discovery" without any need for RRC connection establishment. This solution is potentially the most optimal in terms of signaling.

To implement the second alternative aspect, the client device may initiate a random access channel (RACH), and after network access node response, the client device may send a new RRC SQP Query. By way of example, the network access node response may be the same or similar to an eNB response (e.g., "Message 2"). Also by way of example, the RRC SQP Query may be a request for information regarding available service provider information and an authentication method. The network access node may reply with the new RRC SQP Response. The transaction may be assumed to be finished after the RRC SQP Response.

This second alternative aspect may use a specific RACH; the network access node might provide certain/specific resources for the transaction.

Service Query Protocol (SQP) Call Flow

Figure 10:
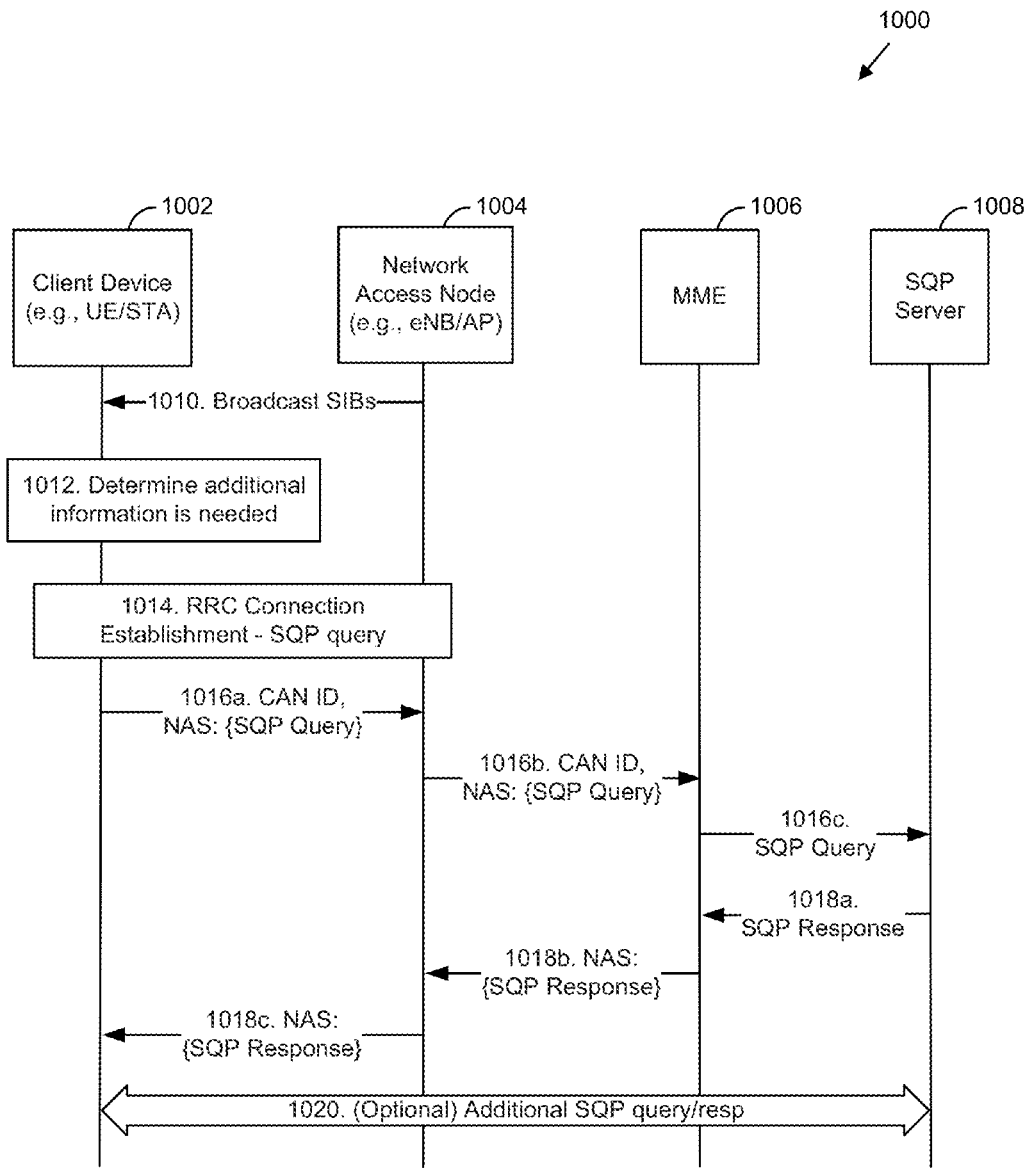
FIG. 10 illustrates a first call flow diagram in accordance with a first exemplary aspect.

FIG. 10 illustrates a first call flow diagram 1000 in accordance with a first exemplary aspect. The aspect of FIG. 10 may find utility in a next generation (5G) network, but is not limited thereto.

The procedures of the call flow of FIG. 10 assume use of NAS transport for SQP signaling. Alternatively, steps 1016a-c and 1018a-c can be performed over RRC transport (in which case the SQP query may or may not be routed through an MME 1006).

Turning now to FIG. 10, a network access node 1004 (e.g., eNB/AP) may broadcast 1010 information (e.g., capability information) in a SIB1 (system information block-type 1) beacon, to indicate, for example: one or more CAN IDs; availability of RAN sharing (i.e., that the network access node is shared by a plurality of connectivity access networks); availability of SQP; and/or to provide a list of serving network identifiers, MNOs, connectivity access network providers, and/or service providers associated with the network access node 1004 (e.g., eNB/AP).

A client device 1002 (e.g., UE/STA) may determine 1012 that additional information may be needed. The determination may occur after the broadcast (e.g., SIB1 beacon) is detected and decoded. If additional information is needed, the client device 1002 may determine whether to obtain an element of information related to a service parameter from the network access node 1004. For example, the client device 1002 may determine that additional information about one of the MNOs/connectivity access network providers/service providers identified in the broadcast from the network access node 1004 may be needed before the client device 1002 attaches to this network.

The client device 1002 may establish 1014 an RRC connection with network access node 1004. The RRC connection may be authenticated or unauthenticated. The connection may be established by including a new cause code, for example "SQP query" in an RRC connection request, or by other methods.

Using the RRC connection, the client device 1002 may send 1016a an SQP query over NAS signaling, where the SQP query may be associated with a serving network identifier. The serving network identifier may uniquely identify by an SQP server 1008. The serving network identifier may be a CAN ID or some other identifier. The SQP query may include a request for information for service discovery to determine the service information of the connectivity access network (CAN) provider/MNO/service provider associated with the serving network identifier associated with the SQP server 1008.

A processing circuit of the client device 1002 may configure the query according to one of a plurality of modes. For example, the processing circuit may configure the query according to a first mode, and may include, as the element of information, a null-value. The processing circuit may configure the query according to a second mode, and may include, as the element of information, a service. The processing circuit may alternatively configure the query according to a second mode, and may include, as the element of information, an identifier of a connectivity access network and/or a service provider. The processing circuit may alternatively configure the query according to a third mode, and may include, as the element of information, an identifier of a connectivity access network and/or service provider that was not identified in a broadcast made by a network access node.

The SQP query may be forwarded 1016*b* to the NAS layer of an MME 1006. The MME 1006 may forward 1016*c* the SQP query from the NAS layer of the MME 1006 to the SQP layer of the SQP server 1008 associated with the serving network identifier. The SQP server 1008 may return 1018*a* an SQP response to the MME 1006. The MME 1006 may return 1018*b* the SQP response to the network access node 1004. The network access node 1004 may return 1018*c* the SQP response to the client device 1002. The SQP response, may include elements of information relevant to the SQP query.

The client device 1002 may perform 1020 additional query and response exchanges with the SQP server 1008. Additionally or alternatively, the client device 1002 may perform additional query and response exchanges with another SQP server (not shown) associated with the network access node 1004 by using a different serving network identifier.

In one alternative aspect, the SQP signaling may be transported over Generic NAS transport as defined in 3GPP Technical Specification (TS) 24.301. For example, a new type of Generic NAS transport known as "SQP" may be defined for the receiving NAS layer to be able to provide the receiving message to the correct SQP layer. Alternatively, a new NAS SQP query/response pair of messages in accordance with aspects described herein may be defined.

In the case of GWCN (see FIG. 5), the network access node 1104 may determine which MME to forward the SQP query to, based on the serving network identifier, i.e., the network access node 1104 might perform the MME selection for SQP.

In the case of MOCN (see FIG. 6), the network access node 1104 may forward the SQP query to a shared MME (e.g., 608, FIG. 6) for the shared MME 608 to perform SQP server selection based on the serving network identifier associated with the SQP query.

Figure 11:
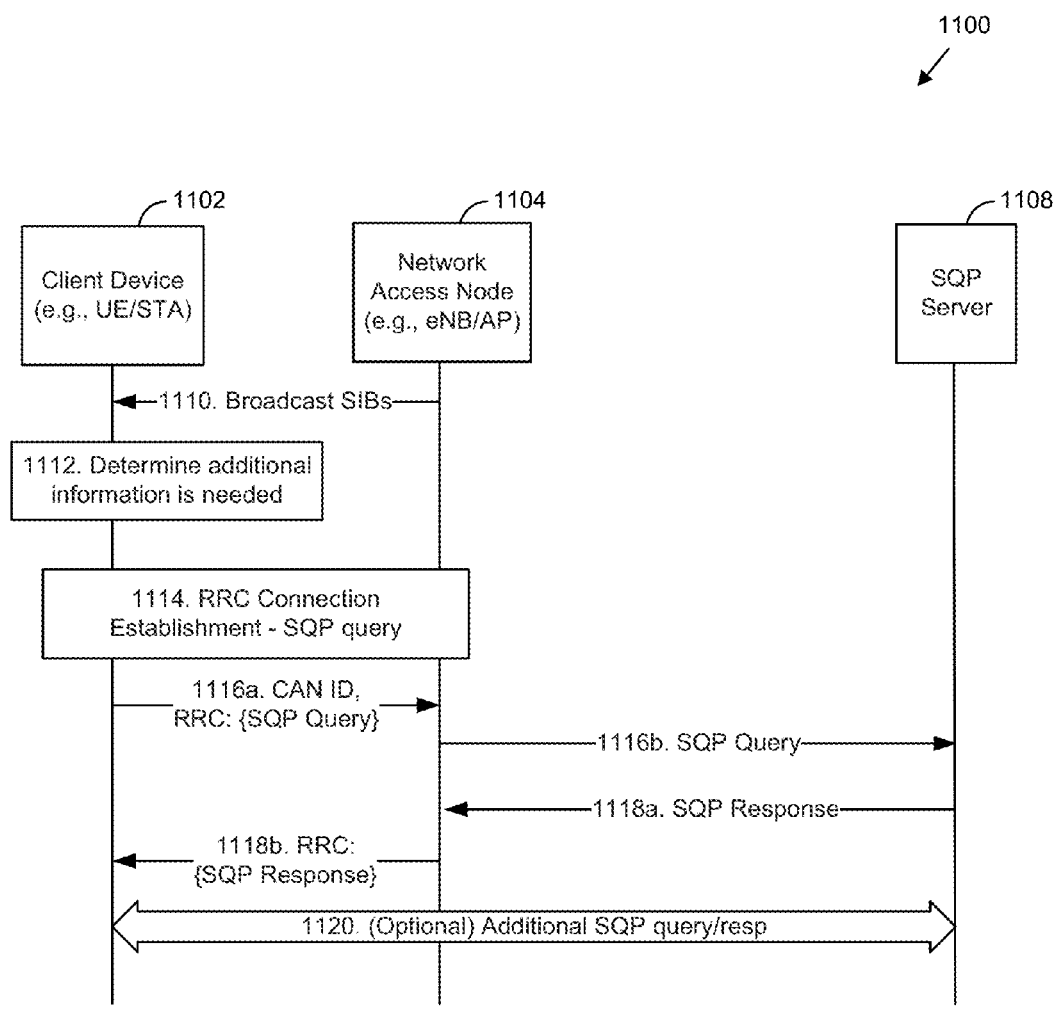
FIG. 11 illustrates a second call flow diagram in accordance with a second exemplary aspect.

FIG. 11 illustrates a second call flow diagram 1100 in accordance with a second exemplary aspect. The aspect of FIG. 11 may find utility in a next generation (5G) network but is not limited thereto.

The procedures of the call flow of FIG. 11 assume use of RRC for transport of SQP signaling.

Turning now to FIG. 11, a network access node 1104 (e.g., eNB/AP) may broadcast 1110 information, for example in a SIB1 beacon, to indicate: one or more CAN IDs; availability of RAN sharing (i.e., that the network access node is shared by a plurality of connectivity access networks); availability of SQP, and/or to provide a list of serving network identifiers, MNOs, connectivity access network providers, and/or service providers associated with the network access node 1104 (e.g., eNB/AP).

A client device 1002 (e.g., UE/STA) may determine 1012 that additional information may be needed. The determination may occur after the broadcast (e.g., SIB1 beacon) is detected and decoded. If additional information is needed, the client device 1002 may determine whether to obtain an element of information related to a service parameter from the network access node 1004. For example, the client device 1002 may determine that additional information about one of the MNOs/connectivity access network providers/service providers identified in the broadcast from the network access node 1004 may be needed before the client device 1002 attaches to this network.

The client device 1102 may establish 1114 an RRC connection with the network access node 1104. The RRC connection may be authenticated or unauthenticated. The connection may be established by including a new cause code, for example "SQP query" in the RRC connection request, or by other methods.

Using the RRC connection, the client device 1102 may send 1116*a* an SQP query over RRC signaling to the RRC layer of the network access node 1104. The SQP query may be associated with a serving network identifier. The serving network identifier may uniquely identify by an SQP server 1108. The serving network identifier may be a CAN ID or some other identifier. The SQP query may include a request for information for service discovery to determine the service information of the connectivity access network (CAN) provider/MNO/service provider associated with the serving network identifier associated with the SQP server 1108.

The network access node 1104 may forward Ill 6*b* the SQP query from the RRC layer of the network access node 1104 to the SQP layer of the SQP server 1108 associated with the serving network identifier. The SQP server 1108 may return 1118*a* an SQP response to the network access node 1104. The network access node 1104 may return 1118*b* the SQP response to the client device 1102 over RRC signaling. The SQP response, may include elements of information relevant to the SQP query.

The client device 1102 may perform 1120 additional query and response exchanges with the SQP server 1108. Additionally or alternatively, the client device 1102 may perform additional query and response exchanges with another SQP server (not shown) associated with the network access node 1104 by using a different serving network identifier.

Figure 12:
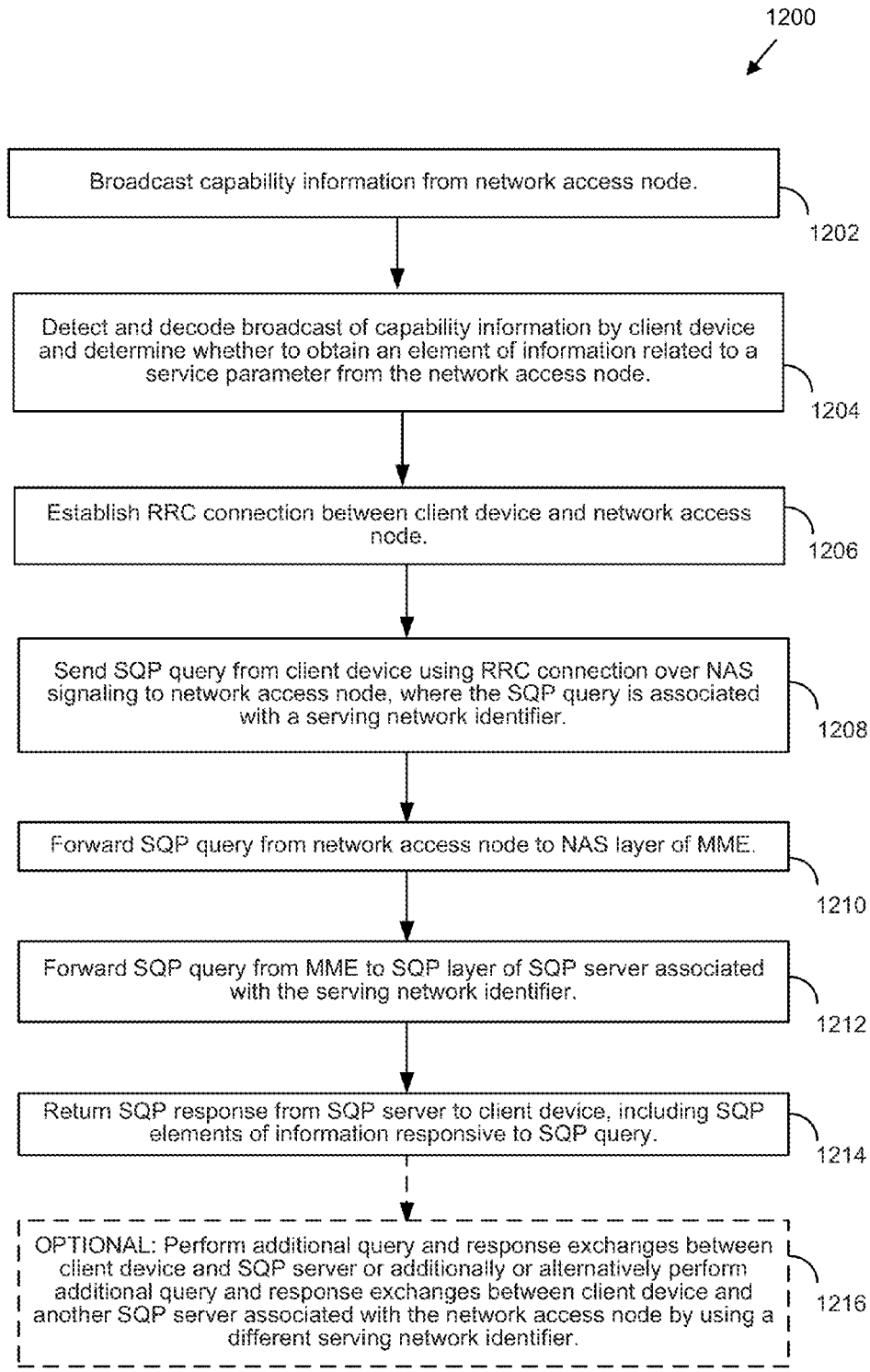
FIG. 12 is a block diagram illustrating an exemplary method in accordance with an exemplary call flow.

FIG. 12 is a block diagram illustrating an exemplary method in accordance with an exemplary call flow. The call flow may be similar, for example, to that of FIG. 10. The exemplary method may be operational, for example, at a client device or at a network access node. A network access node may broadcast information (e.g., capability information) in an over-the-air broadcast to advertise the capabilities of the network access node 1202. The broadcast may include information such as, for example, CAN ID, availability of RAN sharing, availability of SQP, and/or list of serving network identifiers of MNOs/connectivity access network providers/service providers associated with the network access node. A client device may detect and decode the broadcast and determine whether to obtain an element of information related to a service parameter from the network access node 1204. The client device and network access node may establish an RRC connection 1206. The RRC connection may be authenticated or unauthenticated. The RRC connection may be established by including a new cause code, for example "SQP query" in the RRC connection request, or by other methods.

Using the RRC connection, the client device may send an SQP query over NAS signaling to the network access node 1208. The SQP query may be associated with a serving network identifier. In some aspects, the serving network identifier may uniquely identify an SQP server. The SQP query may be forwarded from the network access node to an NAS layer of an MME 1210. The MME may forward the SQP query to an SQP layer of the SQP server associated with the serving network identifier 1212. The SQP server may return an SQP response, including relevant elements of information responsive to the SQP query, to the client device 1214. The client device may optionally perform additional query and response exchanges with the SQP server or additionally or alternatively may perform additional query and response exchanges with another SQP server associated with the network access node by using a different serving network identifier 1216.

Figure 13:
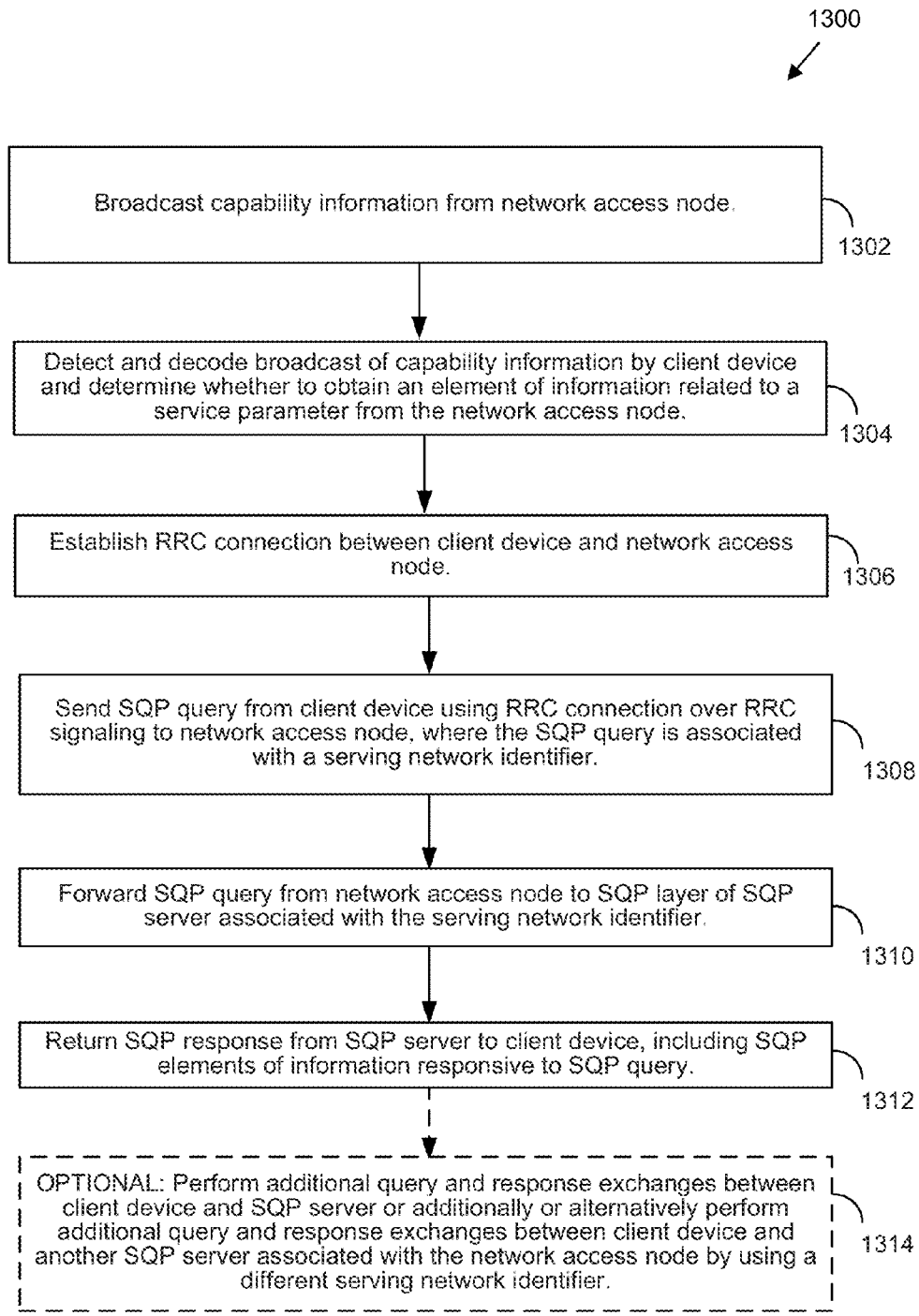
FIG. 13 is a block diagram illustrating an exemplary method in accordance with another exemplary call flow.

FIG. 13 is a block diagram illustrating an exemplary method 1300 in accordance with another exemplary call flow. The call flow may be similar, for example, to that of FIG. 11. The exemplary method may be operational, for example, at a client device or at a network access node. A network access node may broadcast information (e.g., capability information) in an over-the-air broadcast to advertise the capabilities of the network access node 1302. The broadcast may include information such as, for example, CAN ID, availability of RAN sharing, availability of SQP and/or list of serving network identifiers of MNOs/connectivity access network providers/service providers associated with the network access node. A client device may detect and decode the broadcast and determine whether to obtain an element of information related to a service parameter from the network access node 1304. The client device and network access node may establish an RRC connection 1306. The RRC connection may be authenticated or unauthenticated. The RRC connection may be established by including a new cause code, for example "SQP query" in the RRC connection request, or by other methods.

Using the RRC connection, the client device may send an SQP query over RRC signaling to the network access node 1308. The SQP query may be associated with a serving network identifier. The serving network identifier may uniquely identify an SQP server. The SQP query may be forwarded from the network access node to an SQP layer of the SQP server associated with the serving network identifier 1310. The SQP server may return an SQP response, including relevant elements of information responsive to the SQP query, to the client device 1312. The client device may optionally perform additional query and response exchanges with the SQP server or additionally or alternatively may perform additional query and response exchanges with another SQP server associated with the network access node by using a different serving network identifier 1314.

Exemplary Client Device (e.g., UE)

Figure 14:
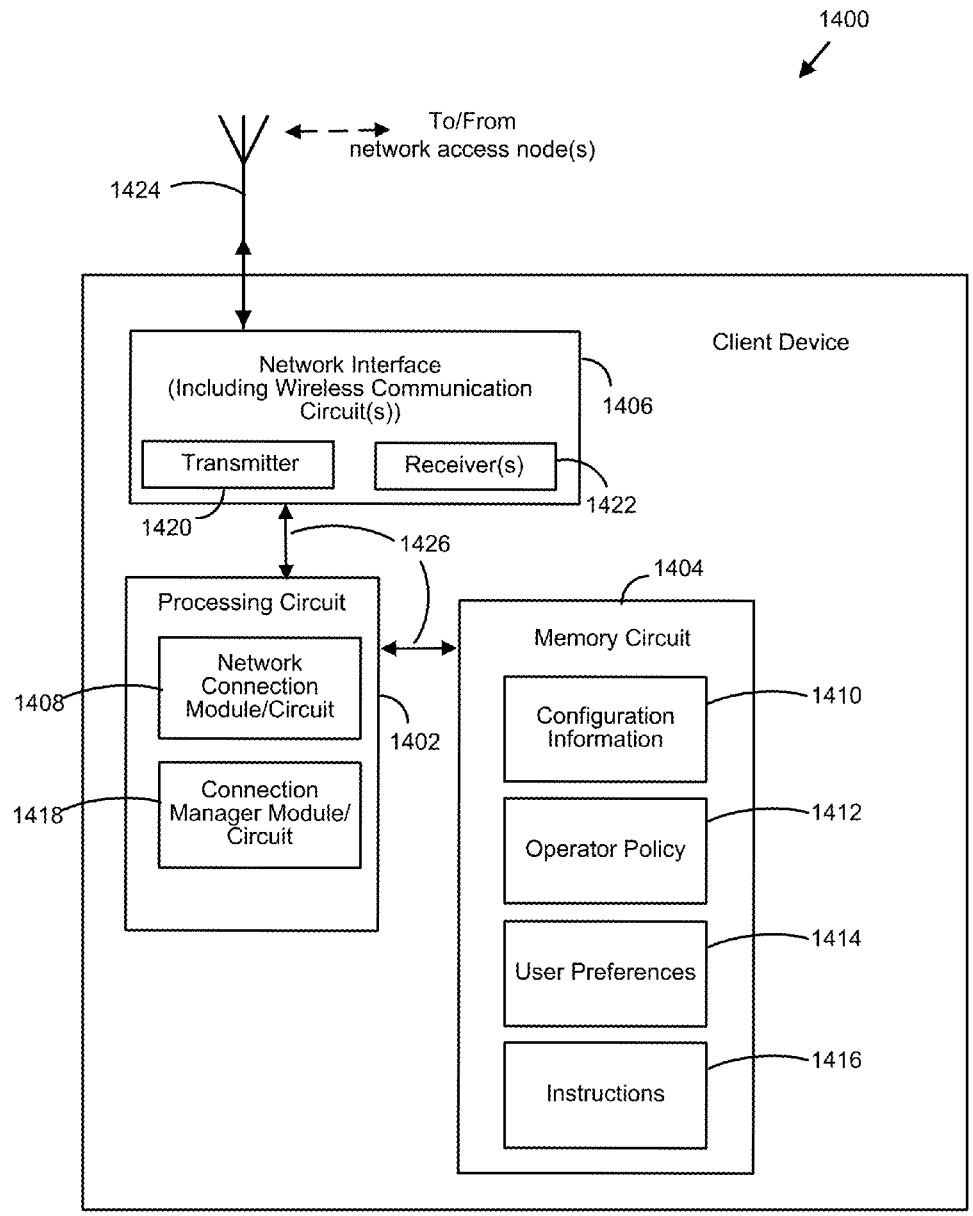
FIG. 14 is a functional block diagram of one aspect of an exemplary client device that may implement service query protocol.

FIG. 14 is a functional block diagram of one aspect of an exemplary client device 1400 that may implement service query protocol. The client device 1400 may generally include a processing circuit 1402 (e.g., processor, processing module, etc.) coupled to a memory circuit 1404 (e.g., memory, memory device, memory module, etc.), and a network interface 1406, where the network interface 1406 may include a wireless communication circuit.

The processing circuit 1402 may be configured to establish a wireless connection with, for example, network access nodes (e.g., network access node 236, 238) via the network interface 1406, to send and/or receive information to/from a network and/or service provider (via the network access nodes). Transmission and/or reception of communication signals may be through an antenna 1424. One antenna 1424 is shown for illustrative purposes; however, it will be understood that the client device 1400 may have one or more antennae 1424 to support, for example, multiple input multiple output (MIMO) operations. The processing circuit 1402 may be coupled to the memory circuit 1404 such that the processing circuit 1402 can read information from, and write information to, the memory circuit 1404. The memory circuit 1404 may include data representative of configuration information 1410 of a present configuration of the client device 1400 and/or any potential future configuration options of the client device 1400. The memory circuit 1404 may further include data representative of operator policies 1412, for example, identification of partner networks (e.g., Organization Identifier (OI) or PLMN identifiers) that are acceptable for the client device 1400 to connect to, etc. An OI is a unique identifier assigned to a service provider when the service provider registers with an IEEE registration authority. An AP can include a service provider OI in beacons and probe responses to client devices. A Public Land Mobile Network (PLMN) is a network that is established and operated by an administration or by a recognized operating agency (ROA) for the purpose of providing land mobile telecommunications services to the public. A PLMN is identified by the Mobile Country Code (MCC) and the Mobile Network Code (MNC). Each operator providing mobile services may have its own PLMN. PLMNs interconnect with other PLMNs and Public Switched Telephone Networks (PSTNs) for telephone communications or with Internet service providers for data and Internet access of which links are defined as interconnect links between providers.

The memory circuit 1404 may include data representative of user preferences 1414, such as, for example, whether roaming is permitted, etc. The memory circuit 1404 may include instructions 1416 that when executed by the processing circuit 1402 may cause the processing circuit 1402 to perform methods such as those described in the exemplary aspects disclosed herein.

The processing circuit 1402 may also include a network connection module/circuit 1408 for establishing a network connection (via the network interface 1406) with one or more network access nodes (e.g., APs, eNBs). The processing circuit 1402 may also include a connection manager module/circuit 1418, which may utilize information received from a network access node, configuration information 1410, operator policies 1412, and user preferences 1414 to automate connectivity access network/service provider selection and traffic steering to a network access node.

The network interface 1406 may include one or more transmitters 1420 and one or more receivers 1422. The one or more transmitters 1420 may configured to send packets for one or more active communication sessions. The one or more receivers 1422 may be configured to allow the client device 1400 to maintain one or more active communication sessions with one or more network access nodes.

The client device 1400 may further include at least one communication bus 1426, which couples the various modules/devices of the client device 1400 to one another.

According to one or more features, the processing circuit 1402 may be configured to perform any or all of the processes, functions, steps and/or routines described herein. As used herein, the term "configured" in relation to the processing circuit 1402 may refer to the processing circuit 1402 being one or more of adapted, employed, implemented, or programmed to perform a particular process, function, step, and/or routine according to various features or aspects described herein.

Figure 15:
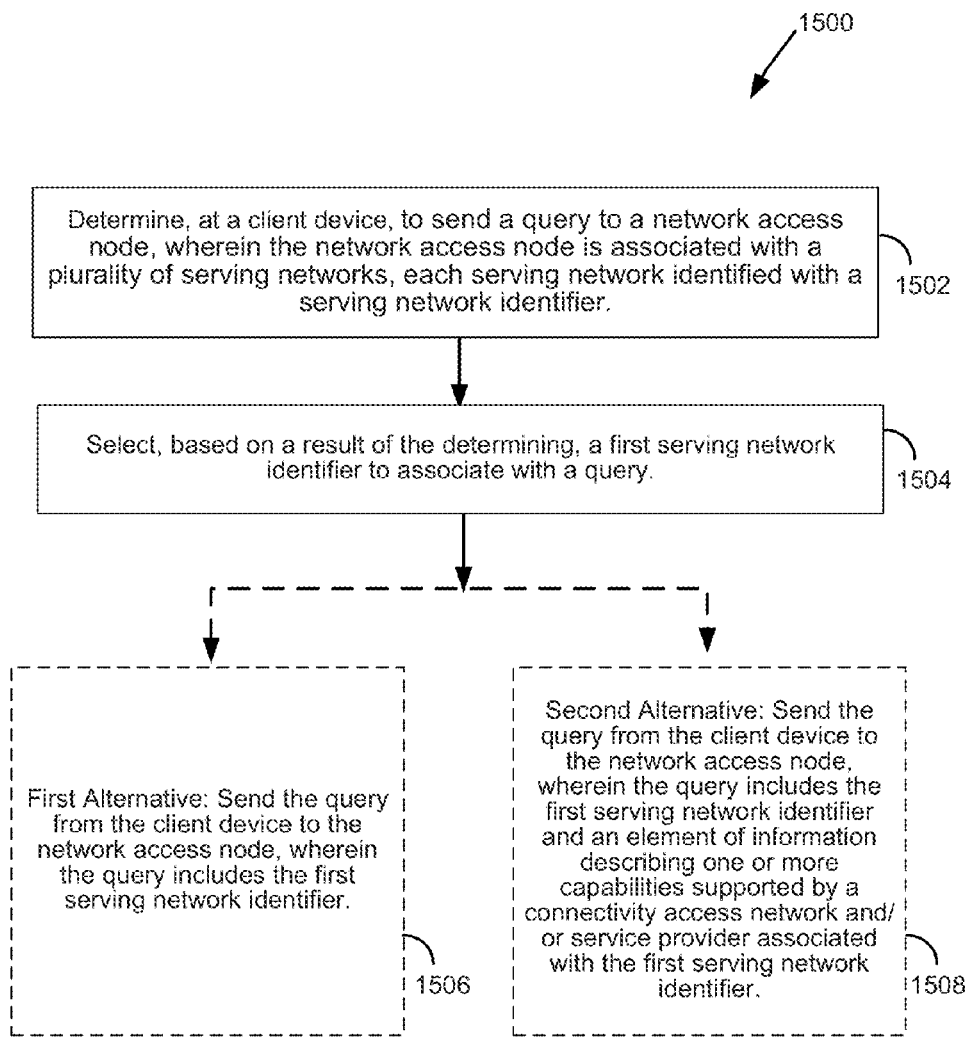
FIG. 15 is a first exemplary method operational in an exemplary client device in accordance with an exemplary aspect described herein.

FIG. 15 is a first exemplary method 1500 operational in an exemplary client device in accordance with an exemplary aspect described herein. The exemplary client device may be similar, for example, to the exemplary client device 1400 of FIG. 14. The method may begin by determining, at the client device, to send a query to a network access node, wherein the network access node may be associated with a plurality of serving networks, each serving network identified with a serving network identifier 1502. In some aspects, an action of determining whether to obtain an element of information related to a service parameter from a network access node may additionally or alternatively be taken. In some aspects, determining whether to send a query and determining whether to obtain an element of information are substantially synonymous actions. The processing circuit 1402 may be configured to derive the query such that the query includes an element of information, the element of information describing one or more network capabilities supported by a network associated with a first serving network identifier.

In some aspects, any of the plurality of connectivity access networks may be associated with a plurality of services and/or service providers. As used herein, a connectivity access network may be operated by a connectivity access network provider (sometimes referred to as an MNO). The terms connectivity access network provider and service provider may be understood as references to separate entities; however, nothing herein is intended to preclude a connectivity access network provider from being both a connectivity access network provider and a service provider. Likewise, nothing herein is intended to preclude a service provider from being both a connectivity access network provider and a service provider.

Subsequent to making the determination of whether to send the query to the network access node (or to obtain the element of information related to the service parameter from the network access node), a processing circuit of the client device may cause the client device to select a first serving network identifier to associate with the query 1504. Selecting the first serving network identifier may be based on a result of the previous step of determining whether to send the query. Various methods may be used to select the first serving network identifier, or any serving network identifier. For example, to facilitate selection, a client device, a network access node, and/or an SQP server may store a listing of serving network identifiers. The listing of serving network identifiers may be cross-referenced, for example, to elements of information, roaming consortium identifiers, and/or any parameter that may be useful to a client device in a process of selecting one or more serving network identifiers to associate with a query, such as an SQP query.

Upon selection of the first serving network identifier, the processing circuit, may cause the client device to send the query, including the first serving network identifier, from the client device to the network access node 1506. The sending of the query including the first serving network identifier may be considered a first alternative. As a second alternative, the processing circuit, may cause the client device to send the query from the client device to the network access node, wherein the query includes the first serving network identifier and an element of information describing one or more capabilities supported by a connectivity access network and/or service provider associated with the first serving network identifier 1508. In some aspects, the element of information included with the query may describe one or more network capabilities supported by a network associated with a first serving network identifier. In some aspects, the first serving network identifier may identify a server of a first serving network in the plurality of serving networks.

The query may be sent as an over-the-air message. The over-the-air message may be sent as an authenticated or unauthenticated message from the client device to the network access node. If sent as an unauthenticated message, the message may be sent before the client device attaches to the network access node. In this way, the client device can communicate with the network access node without having to commit to a connectivity access network. In some aspects, the unauthenticated message may be conveyed in a layer 3 message. In some aspects, the unauthenticated messages may be conveyed via a radio resource control (RRC) message and/or a non-access stratum (NAS) message.

Figure 16:
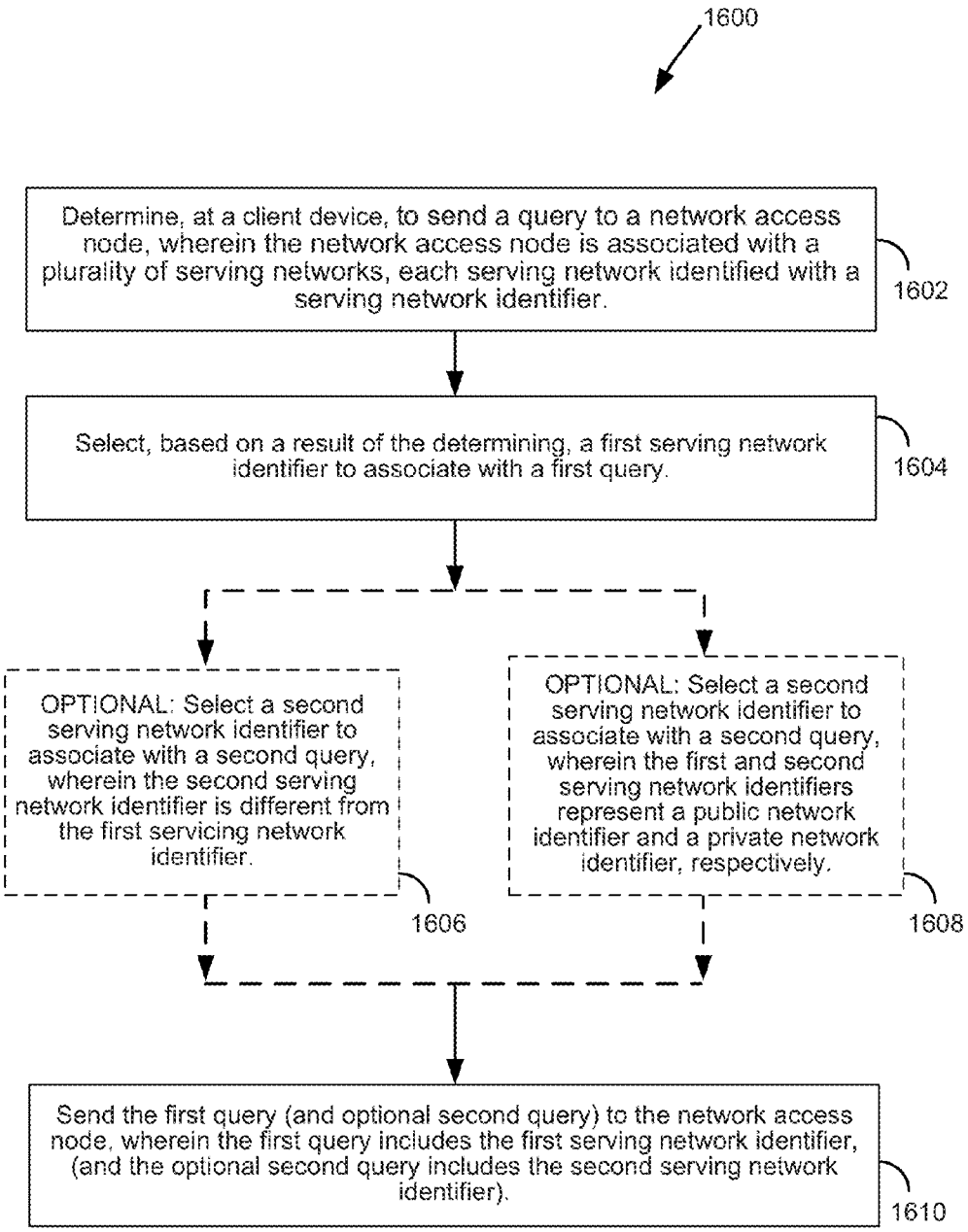
FIG. 16 is a second exemplary method operational in an exemplary client device in accordance with an exemplary aspect described herein.

FIG. 16 is a second exemplary method 1600 operational in an exemplary client device in accordance with an exemplary aspect described herein. The exemplary client device may be similar, for example, to the client device 1400 of FIG. 14. The method may begin by determining, at the client device, determining, at the client device, to send a query to a network access node, wherein the network access node may be associated with a plurality of serving networks, each serving network identified with a serving network identifier 1602.

Subsequent to making the determination of whether to send the query to the network access node, a processing circuit of the client device may cause the client device to select a first serving network identifier to associate with the query 1604. Selecting the first serving network identifier may be based on a result of the previous step of determining whether to obtain the element of information. As indicated previously, various methods may be used to select the first serving network identifier, or any serving network identifier. To facilitate selection, a client device, a network access node, and/or an SQP server may store a listing of serving network identifiers. The listing of serving network identifiers may be cross-referenced, for example, to elements of information, roaming consortium identifiers, and/or any parameter that may be useful to a client device in a process of selecting one or more serving network identifiers to associate with a query, such as an SQP query.

Subsequent to selecting the first serving network identifier, one of two alternative actions may be taken. As a first alternative, a second serving network identifier, to associate with the query, may be determined, wherein the second serving network identifier is different from the first serving network identifier 1606. As a second alternative, a second serving network identifier, to associate with a second query, may be determined, wherein the first and second network identifiers represent a public network identifier and a private network identifier, respectively, of the same network 1608.

Upon selection of the first and second serving network identifiers, the first and second queries may be sent as one or more over-the-air messages from the client device to the network access node 1610. The first query may be associated with the first serving network identifier and the second query may be associated with the second serving network identifier. The over-the-air message may be sent as an unauthenticated message from the client device to the network access node before the client device attaches to the network access node. In this way, the client device can communicate with the network access node without having to commit to a connectivity access network. In some aspects, the unauthenticated message may be conveyed in a layer 3 message. In some aspects, the unauthenticated messages may be conveyed via a radio resource control (RRC) message and/or a non-access stratum (NAS) message.

Exemplary Network Node (e.g., eNB, AP, MME)

Figure 17:
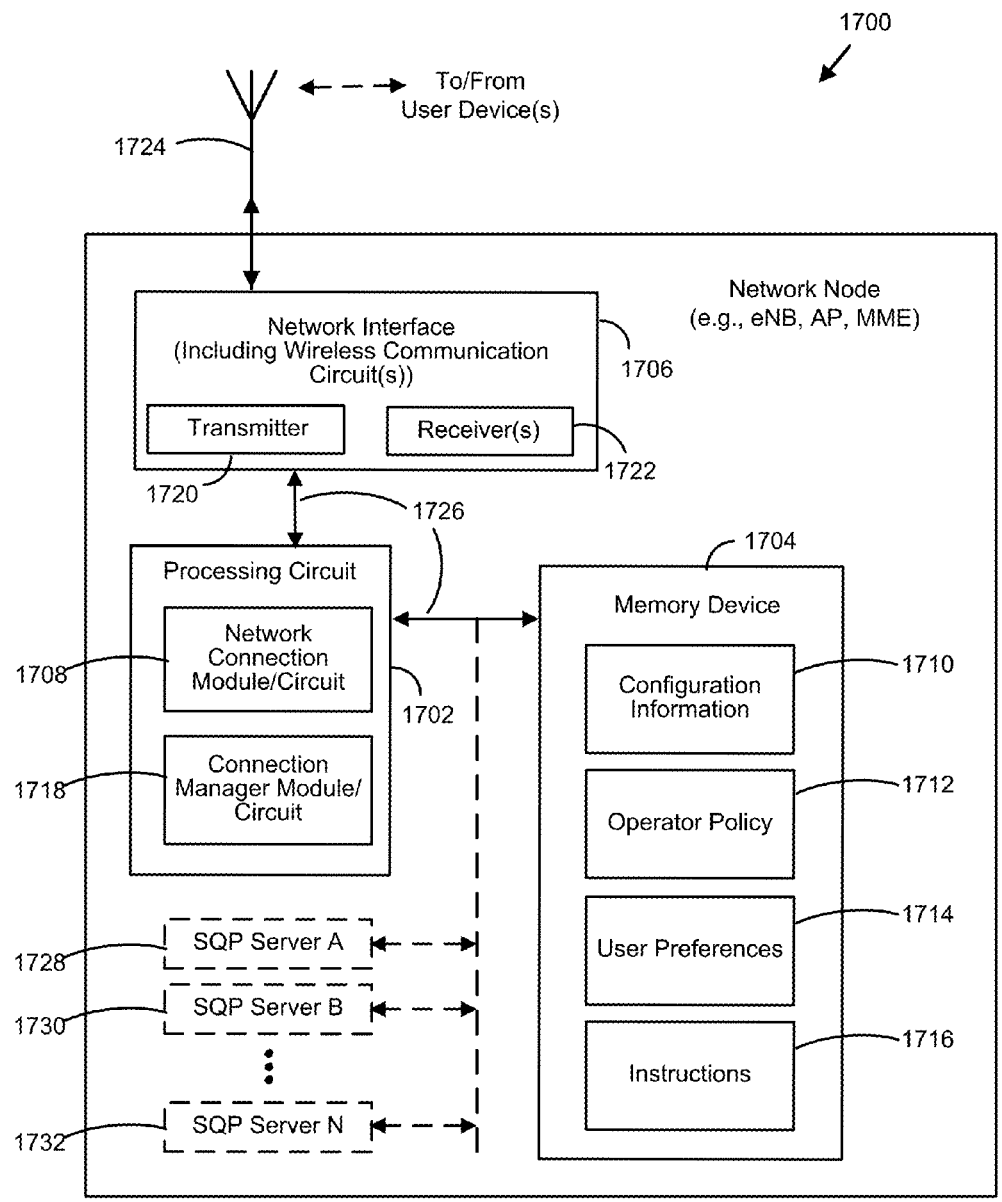
FIG. 17 is a functional block diagram of one aspect of an exemplary network node that may implement service query protocol.

FIG. 17 is a functional block diagram of one aspect of an exemplary network node 1700 that may implement service query protocol. The network node 1700 of FIG. 17 may be representative of a network access node (e.g., eNB, AP) and/or an MME. The network access node 1700 may generally include a processing circuit 1702 (e.g., processor, processing module, etc.) coupled to a memory circuit 1704

(e.g., memory, memory module, etc.), and a network interface 1706, where the network interface 1706 may include a wireless communication circuit.

The processing circuit 1702 may be configured to establish a wireless connection with, for example, client device(s) via the network interface 1706, to send and/or receive information to/from the client device(s). Transmission and/or reception of communication signals may be through an antenna 1724. One antenna 1724 is shown for illustrative purposes; however, it will be understood that the network access node 1700 may have one or more antennae 1724 to support, for example, multiple input multiple output (MIMO) operations. The processing circuit 1702 may be coupled to the memory circuit 1704 such that the processing circuit 1702 can read information from, and write information to, the memory circuit 1704. The memory circuit 1704 may include data representative of network access node configuration information 1710 of a present configuration of the network access node 1700 and/or any potential future configuration options of the network access node 1700. The memory circuit 1704 may further include data representative of operator policies 1712. The memory circuit 1704 may include data representative of operator preferences 1714. The memory circuit 1704 may include instructions 1716 that when executed by the processing circuit 1702 will cause the processing circuit 1702 to perform methods such as those described in the exemplary aspects disclosed herein.

The processing circuit 1702 may also include a network connection module/circuit 1708 for establishing a network connection (via the network interface 1706) with one or more client devices. The processing circuit 1702 may also include a connection manager module/circuit 1718, which may manage information relating to client device traffic steering, network access node configuration information 1710, operator policies 1712, and operator preferences 1714 to assist a client device in selecting and steering data to the network access node 1700.

The network interface 1706 may include one or more transmitters 1720 and one or more receivers 1722. The one or more transmitters 1720 may configured to send packets for two or more active communication sessions. The one or more receivers 1722 may be configured to allow the network access node 1700 to maintain two or more active communication sessions with one or more client devices.

The network access node 1700 may further include at least one communication bus 1726, which couples the various modules/devices of the network access node 1700 to one another.

Still further, in some aspects, the network access node may include one or more service query protocol (SQP) servers 1728, 1730, 1732. SQP servers 1728, 1730, 1732 may couple to the communication bus 1726 to, for example, permit the processing circuit 1702 to access data from, and write data to, the SQP servers 1728, 1730, 1732. SQP servers 1728, 1730, 1732 and their interconnection with the communication bus 1726 are represented in dashed line to illustrate that the SQP servers 1728, 1730, 1732 represent an optional aspect.

According to one or more features, the processing circuit 1702 may be configured to perform any or all of the processes, functions, steps and/or routines described herein. As used herein, the term "configured" in relation to the processing circuit 1702 may refer to the processing circuit 1702 being one or more of adapted, employed, implemented, or programmed to perform a particular process, function, step and/or routine according to various features described herein.

Figure 18:
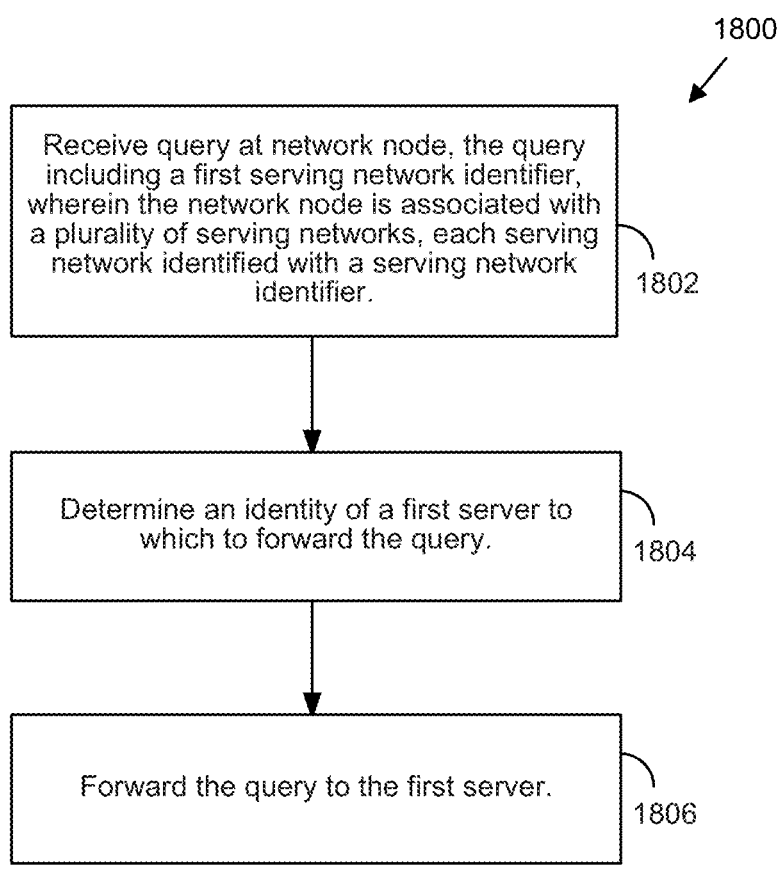
FIG. 18 is a first exemplary method operational in an exemplary access node in accordance with an exemplary aspect described herein.

FIG. 18 is a first exemplary method 1800 operational in an exemplary access node in accordance with an exemplary aspect described herein. The exemplary access node may be similar, for example, to the exemplary access node 1700 of FIG. 17. The exemplary method 1800 may be operational at network nodes including network access nodes (e.g., eNB, AP) and MMEs. A query including a first serving network identifier may be received at the network node, wherein the network node is associated with a plurality of serving networks, each serving network identified with a serving network identifier 1802. The query may be a service query protocol (SQP) query. The query may be from, for example, a client device. According to some aspects, the query may be associated with or include an element of information in addition to the first serving network identifier.

At the network node, an identity of a first server to which to forward the query may be determined 1804. In one aspect, the first serving network identifier associated with or included with the SQP query may identify the first server. Once the identity of the first server is determined, the query may be forwarded to the first server 1806.

Figure 19:
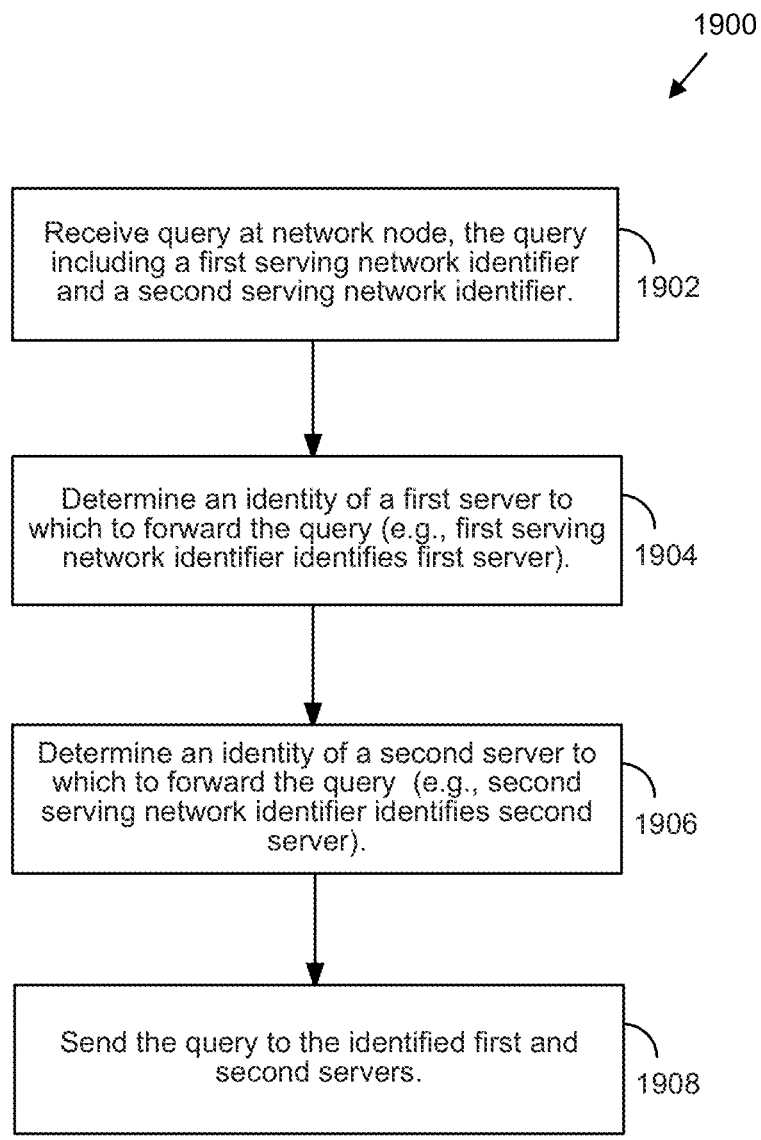
FIG. 19 is a second exemplary method operational in an exemplary access node in accordance with an exemplary aspect described herein.

FIG. 19 is a second exemplary method 1900 operational in an exemplary access node in accordance with an exemplary aspect described herein. The exemplary access node may be similar, for example, to the exemplary access node 1700 of FIG. 17. The exemplary method 1900 may be operational at network nodes including network access nodes (e.g., eNB, AP) and MMEs. A query including a first serving network identifier and a second serving network identifier may be received at the network node, wherein the network node is associated with a plurality of serving networks, each serving network identified with a serving network identifier 1902. The query may be a service query protocol (SQP) query. The query may be from, for example, a client device. According to some aspects, the query may be associated with or include an element of information in addition to the first and second serving network identifiers. The first and second serving network identifiers may be different from one another. In the aspect of FIG. 19, if the first and second serving network identifiers are different, then the identities of first and second servers that correspond to the first and second serving network identifiers, respectively, may also be different. Accordingly, at the network node, an identity of a first server to which to forward the query may be determined 1904. In one aspect, the first serving network identifier may identify the first server. Additionally, at the network node, an identity of a second server to which to forward the query may be determined 1906. In one aspect, the second serving network identifier may identify the second server. In accordance with the aspect of FIG. 19, the query may be sent to both the first server (e.g., identified by the first serving network identifier) and the second server (e.g., identified by the second serving network identifier) 1908.

In some embodiments, the first serving network identifier may identify a first server and the second serving network identifier may identify a second server, different from the first server. In some embodiments, the first and second serving network identifiers may be two types of network identifiers. In some embodiments, the types of serving network identifiers may include service set identifier (SSID), public land mobile network identifier (PLMN ID), service provider identifier (SPI), and network access identifier (NAI) realm types. In some embodiments, the first and second serving network identifiers may represent a public network identifier and a private network identifier, respectively.

Exemplary SQP Server

Figure 20:
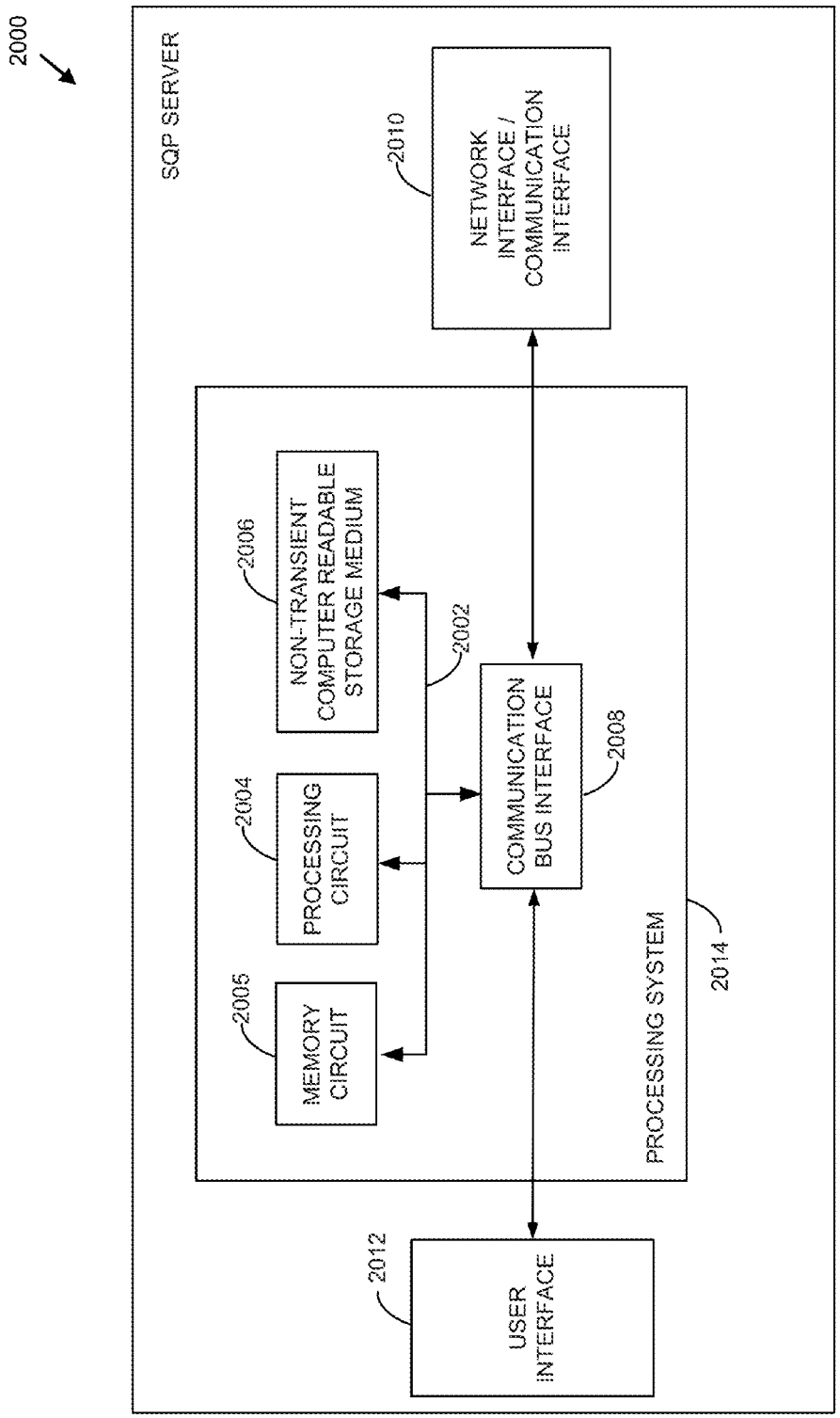
FIG. 20 is a functional block diagram of one aspect of a server, which may serve as an SQP server, in accordance with an exemplary aspect.

FIG. 20 is a functional block diagram of one aspect of a server, which may serve as an SQP server 2000, in accordance with an exemplary aspect. The SQP server 2000 may execute any of the various instructions needed to carry out the methods described in the aspects described herein, may store, in one or more non-transient computer-readable storage devices, any data, elements of information, service provider identifiers, network access node identifiers, and any instructions that may be useful in carrying out the methods of the aspects described herein.

The SQP server 2000 may include a network interface 2010, where the network interface 2010 may include a wireless communication circuit, a user interface 2012, and a processing system 2014. The processing system 2014 may include a processing circuit 2004 (e.g., processor), a memory circuit 2005 (e.g., memory device), a non-transient computer-readable storage medium 2006, a bus interface 2008, and a bus 2002. The processing system 2014 and/or the processing circuit 2004 may be configured to perform any of the steps, functions, and/or processes described and/or illustrated herein.

The processing circuit 2004 may be one or more processors (e.g., first processor, etc.) that are adapted to process data for the SQP server 2000. For example, the processing circuit 2004 may be a specialized processor, such as an application specific integrated circuit (ASIC) that serves as a means for carrying out any one of the operations described herein. The processing circuit 2004 serves as one example of a means for verifying authentication information, deriving authentication information, maintaining a table of connectivity access networks and/or service providers and associated parameters, establishing a secure channel, allowing execution, identifying a device, or establishing a secure channel. The processing circuit 2004 also serves as one example of a means for receiving and/or transmitting.

Examples of processing circuits 2004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 2004 is also responsible for managing the bus 2002, and executing software stored on the non-transient computer-readable storage medium 2006 and/or memory circuit 2005. The software, when executed by the processing circuit 2004, causes the processing system 2014 to perform the various functions, steps, and/or processes described and/or illustrated herein. The non-transient computer-readable storage medium 2006 may be used for storing data that is manipulated by the processing circuit 2004 when executing software.

The memory circuit 2005 may be non-volatile memory, such as but not limited to FLASH memory, magnetic or optical hard disk drives, etc. In some aspects, the memory may be volatile memory, such as DRAM (e.g., DDR SDRAM), SRAM, etc., that may be continuously powered so as to store the information indefinitely. The memory circuit 2005 serves as one example of a means for maintaining a table of connectivity access networks and/or service providers and associated parameters.

Software or instructions shall be construed broadly to mean software, instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transient computer-readable storage medium 2006. Examples of non-transient computer-readable storage medium 2006 may include a magnetic storage device (e.g., hard disk, floppy disk, magnetic strip), an optical disk (e.g., a compact disc (CD) or a digital versatile disc (DVD)), a smart card, a flash memory circuit (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The non-transient computer-readable storage medium 2006 may reside in the processing system 2014, external to the processing system 2014, or distributed across multiple entities including the processing system 2014. The non-transient computer-readable storage medium 2006 may be embodied in a computer program product. Also, the SQP server 2000 could interface with a computer-readable medium that could include, by way of example, a carrier wave, a transmission line, and any other suitable medium for sending software and/or instructions that may be accessed and read by a computer.

In the example of FIG. 20, the processing system 2014 may be implemented with a bus architecture, represented generally by the bus 2002. The bus 2002 may include any number of interconnecting buses and bridges depending on the application of the processing system 2014 and the overall design constraints. The bus 2002 links together various circuits including one or more processors (represented generally by the processing circuit 2004), the memory circuit 2005, and computer-readable media (represented generally by the non-transient computer-readable storage medium 2006). The bus 2002 may also link various other circuits such as timing sources, peripherals, voltage regulators, and power management circuits, which are well known in the art, and therefore, will not be described any further. A bus interface 2008 provides an interface between the bus 2002 and the network interface 2010 (if present). The bus interface 2008 serves as one example of a means for receiving and/or transmitting. The network interface 2010 provides a means for communicating with other apparatuses over a transmission medium. The network interface 2010 serves as one example of a means for receiving and/or transmitting. Depending upon the nature of the apparatus, a user interface 2012 (e.g., keypad, display, speaker, microphone, touchscreen display, etc.) may also be provided for the SQP server 2000.

One or more of the components, steps, features, and/or functions illustrated herein may be rearranged and/or combined into a single component, step, feature or function or embodied in several components, steps, or functions. Additional elements, components, steps, and/or functions may also be added without departing from the disclosure. The algorithms described herein may also be efficiently implemented in software and/or embedded in hardware.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. Similarly, the term "coupled" is used herein with reference to modules/circuits/functions that may electrically and/or mechanically interact with each other in order to achieve a result. The term "null-value" may be used herein to refer to a zero value, an empty value, an empty string, an unknown value, or a predetermined known value.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

In the description, elements, module/circuit/functions, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof.

Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory circuits and/or other machine-readable mediums and, processor-readable mediums, and/or computer-readable mediums for storing information. The terms "machine-readable medium," "computer-readable medium," and/or "processor-readable medium" may include, but are not limited to non-transient mediums such as portable or fixed storage devices, optical storage devices, and various other mediums capable of storing, containing, or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, aspects may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or obtaining information, data, arguments, parameters, or memory contents. Information, arguments, parameters, data, etc. may be passed, forwarded, or sent via any suitable means including memory sharing, message passing, token passing, network transmission, etc.

The various illustrative logical blocks, modules, module/circuit/functions, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing aspects described herein, is considered a special purpose processor for carrying out such aspects. Similarly, a general-purpose computer is considered a special purpose computer when configured for carrying out aspects described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, module/circuit/functions, and algorithm steps described in connection with the aspects disclosed herein may be implemented as electronic hardware, computer software, or combinations of both. To clearly illustrate this interchangeability of hardware and software, various illustrative components, blocks, modules, module/circuit/functions, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

What is claimed is:

1. A method, operational at a client device, comprising:
    determining, at the client device, to send a query to a network access node, wherein the client device selectively associates with at least one of a plurality of serving networks through the network access node, each serving network including at least one connectivity access network, each serving network identified with a serving network identifier;
    selecting a first serving network identifier to associate with the query, wherein the first serving network identifier is sharable by one or more connectivity access networks; and
    sending the query to the network access node, wherein the query includes the first serving network identifier, and
    wherein the query further includes an element of information related to a service parameter, the element of information describing one or more network capabilities supported by a serving network associated with the first serving network identifier.

2. The method of claim 1, wherein the first serving network identifier is a service set identifier (SSID) identifier, a public land mobile network identifier (PLMN ID) identifier, a service provider identifier (SPI) identifier, or a network access identifier (NAI) realm identifier.

3. The method of claim 1, further comprising:
    obtaining, at the client device, prior to determining the first serving network identifier, serving network identifiers of each of the plurality of serving networks associated with the network access node.

4. The method of claim 3, wherein the serving network identifiers are obtained from a broadcast message from the network access node or from a unicast message from the network access node.

5. The method of claim 1, wherein selecting the first serving network identifier is based on whether a preexisting relationship is established between the client device and a serving network identified by the first serving network identifier.

6. The method of claim 5, wherein the preexisting relationship is established when the client device has a subscription with the serving network identified by the first serving network identifier and/or when the first serving network identifier is included on a preexisting list of preferred serving networks configured in the client device.

7. The method of claim 1, further comprising:
    selecting a second serving network identifier to associate with the query prior to sending the query, wherein the second serving network identifier is different from the first serving network identifier; and
    sending the query to the network access node, wherein the query includes the first serving network identifier and the second serving network identifier.

8. The method of claim 7, wherein the first serving network identifier and second serving network identifier identify different servers.

9. The method of claim 7, wherein the first serving network identifier and second serving network identifier are different types of serving network identifiers.

10. The method of claim 9, wherein the different types of serving network identifiers include a service set identifier (SSID) type identifier, a public land mobile network identifier (PLMN ID) type identifier, a service provider identifier (SPI) type identifier, and a network access identifier (NAI) realm type identifier.

11. The method of claim 1, further comprising:
    selecting a second serving network identifier to associate with the query prior to sending the query, wherein the first serving network identifier represents a public serving network and the second serving network identifier represents a private serving network; and
    sending the query to the network access node, wherein the query includes the first serving network identifier and the second serving network identifier.

12. A client device, comprising:
    a network interface; and
    a processing circuit coupled to the network interface, the processing circuit configured to:
        determine to send a query to a network access node, wherein the client device selectively associates with at least one of a plurality of serving networks through the network access node, each serving network including at least one connectivity access network, each serving network identified with a serving network identifier;
        select a first serving network identifier to associate with the query, wherein the first serving network identifier is sharable by one or more connectivity access networks; and send the query to the network access node, wherein the query includes the first serving network identifier, and wherein the query further includes an element of information related to a service parameter, the element of information describing one or more network capabilities supported by a serving network associated with the first serving network identifier.

13. The client device of claim 12, wherein the processing circuit is further configured to obtain serving network identifiers of each of the plurality of serving networks associated with the network access node from a broadcast message from the network access node or from a unicast message from the network access node.

14. The client device of claim 12, wherein the processing circuit is further configured to select the first serving network identifier based on whether a preexisting relationship is established between the client device and a serving network identified by the first serving network identifier.

15. A method operational at a network node, comprising:
receiving, at the network node, a query including a first serving network identifier, wherein the network node is associated with a plurality of serving networks, each serving network including at least one connectivity access network, each serving network identified with a serving network identifier;
determining an identity of a first server to which to forward the query, wherein the first serving network identifier provides the identity of the first server, wherein the first serving network identifier is sharable by one or more connectivity access networks; and
sending the query to the first server,
wherein the query further includes an element of information related to a service parameter, the element of information describing one or more network capabilities supported by a serving network associated with the first serving network identifier.

16. The method of claim 15, wherein the network node is a network access node and/or a mobility management entity (MME).

17. The method of claim 15, wherein the query comprises a non-access stratum (NAS) message, and/or a radio resource control (RRC) message.

18. The method of claim 15, wherein the first serving network identifier identifies a server of a first serving network in the plurality of serving networks.

19. The method of claim 15, wherein the query further includes a second serving network identifier that is different from the first serving network identifier.

20. The method of claim 19, wherein the second serving network identifier identifies a server of a second serving network in the plurality of serving networks.

21. The method of claim 19, further comprising:
determining a second server to which to forward the query, wherein the second serving network identifier identifies a second server of a second serving network in the plurality of serving networks; and
sending the query to the second server.

22. The method of claim 19, wherein the first serving network identifier and second serving network identifier are different types of serving network identifiers.

23. The method of claim 22, wherein the different types of serving network identifiers include a service set identifier (SSID) type identifier, a public land mobile network identifier (PLMN ID) type identifier, a service provider identifier (SPI) type identifier, and a network access identifier (NAI) realm type identifier.

24. The method of claim 19, wherein the first serving network identifier identifies a first server of a public serving network and the second serving network identifier identifies a second server of a private serving network, the method further comprising:
sending the query to the second server.

25. A network node, comprising:
a network interface; and
a processing circuit coupled to the network interface, the processing circuit configured to:
receive a query including a first serving network identifier, wherein the network node is associated with a plurality of serving networks, each serving network including at least one connectivity access network, each serving network identified with a serving network identifier;
determine an identity of a first server to which to forward the query, wherein the first serving network identifier provides the identity of the first server, wherein the first serving network identifier is sharable by one or more connectivity access networks; and
send the query to the first server,
wherein the query further includes an element of information related to a service parameter, the element of information describing one or more network capabilities supported by a serving network associated with the first serving network identifier.

26. The network node of claim 23, wherein the network node is a network access node and/or a mobility management entity (MME).

27. The network node of claim 23, wherein the processing circuit is further configured to:
determine, from a second serving network identifier included with the query, a second server to which to forward the query, wherein the second serving network identifier identifies the second server; and
send the query to the second server.

* * * * *